(12) United States Patent
Yamada et al.

(10) Patent No.: US 7,150,257 B2
(45) Date of Patent: Dec. 19, 2006

(54) VIBRATION DAMPING ENGINE MOUNT FOR INTERNAL COMBUSTION ENGINE

(75) Inventors: Kouji Yamada, Kanagawa (JP); Nobukazu Takahashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 276 days.

(21) Appl. No.: 10/689,834

(22) Filed: Oct. 22, 2003

(65) Prior Publication Data

US 2004/0256777 A1    Dec. 23, 2004

(30) Foreign Application Priority Data

Oct. 22, 2002  (JP)  ............................ 2002-306561
Oct. 22, 2002  (JP)  ............................ 2002-306562

(51) Int. Cl.
*F01L 7/00*   (2006.01)
(52) U.S. Cl. ................ 123/192.1; 267/140.11
(58) Field of Classification Search ............ 123/195 A, 123/192.1, 192.2, 559.1; 267/140.11
See application file for complete search history.

(56) References Cited

U.S. PATENT DOCUMENTS

| | | | |
|---|---|---|---|
| 5,092,566 A | | 3/1992 | Freudenberg |
| 5,246,212 A | * | 9/1993 | Funahashi et al. ..... 267/140.13 |
| 6,120,012 A | | 9/2000 | Shibata et al. |
| 6,158,415 A | * | 12/2000 | Ichikawa et al. ...... 123/339.23 |
| 6,167,860 B1 | * | 1/2001 | Tsukamoto .............. 123/192.1 |
| 6,378,307 B1 | * | 4/2002 | Fledersbacher et al. .... 60/605.2 |
| 6,659,436 B1 | * | 12/2003 | Muramatsu et al. ... 267/140.13 |
| 6,808,168 B1 | * | 10/2004 | Muramatsu et al. ... 267/140.13 |
| 2002/0109279 A1 | | 8/2002 | Muramatsu et al. |

FOREIGN PATENT DOCUMENTS

| | | |
|---|---|---|
| JP | 11-51110 A | 2/1999 |
| JP | 11-201220 A | 7/1999 |
| JP | 2000-255277 A | 9/2000 |

* cited by examiner

*Primary Examiner*—Stephen K. Cronin
*Assistant Examiner*—Katrina B. Harris
(74) *Attorney, Agent, or Firm*—Foley & Lardner LLP

(57) ABSTRACT

In a method applicable to a vibration damping engine mount for an internal combustion engine and the vibration damping engine mount therefor, a varying air pressure is supplied to the vibration controllable support mechanism and one of a negative pressure developed in a negative pressure pump and the atmospheric pressure is supplied to the vibration controllable support mechanism is supplied to a vibration controllable support mechanism constituting the vibration damping engine mount in accordance with the vibration of the internal combustion engine.

26 Claims, 10 Drawing Sheets

FIG.5
THRESHOLD VALUE Ts (msec)
| 6.5 | 6.0 | 5.6 | 5.2 | 5.1 | 5.0 | 4.9 | 4.9 | 4.8 | 4.8 | 4.8 | 4.7 | 4.7 | 4.7 | 4.7 | 4.7 |
REVOLUTION SPEED N$_E$
FIG.6
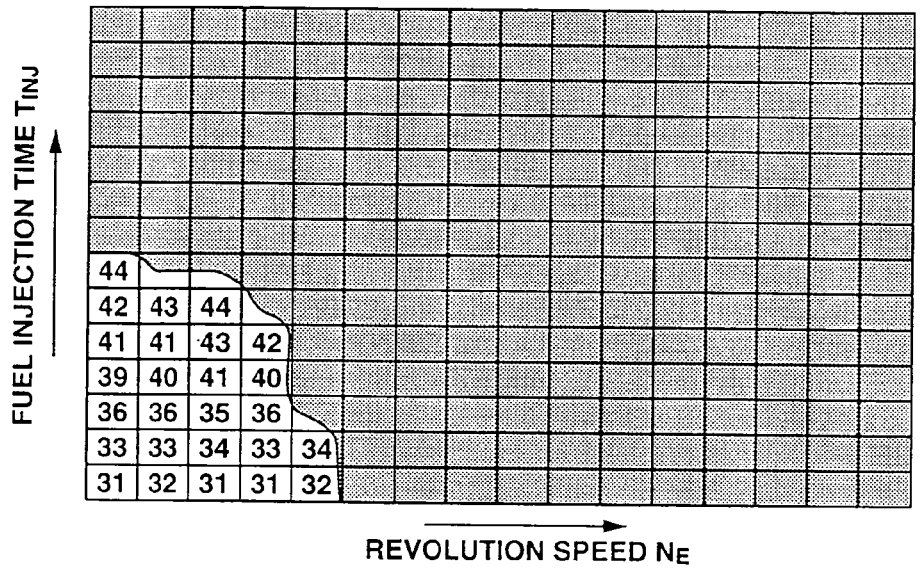
REVOLUTION SPEED N$_E$
FIG.7
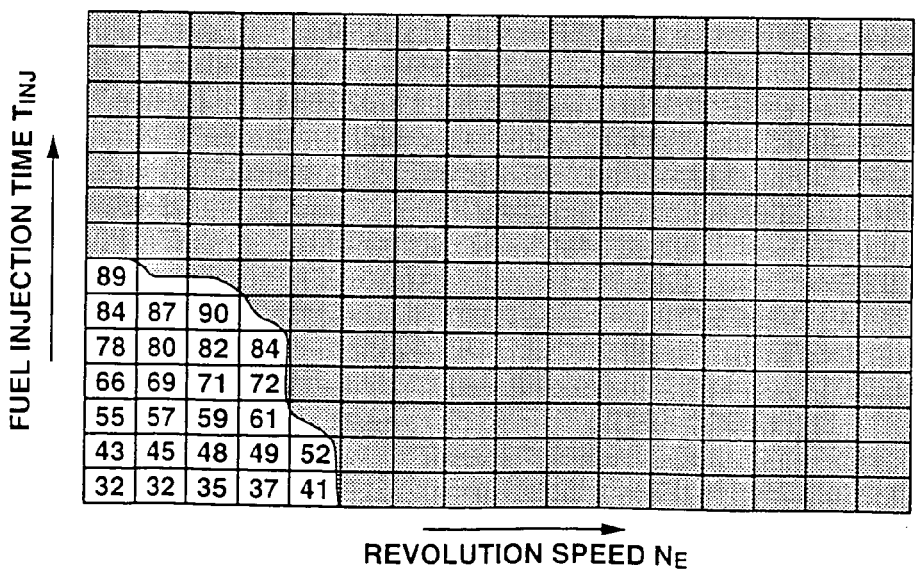
REVOLUTION SPEED N$_E$

VIBRATION DAMPING ENGINE MOUNT FOR INTERNAL COMBUSTION ENGINE

BACKGROUND OF THE INVENTION:

1. Field of the Invention

The present invention relates to a vibration damping (engine) mount to mount an internal combustion engine which is capable of generating a damping vibration against a vibration, particularly, developed on an internal combustion engine which is mounted on an automotive vehicle via the engine mount.

2. Description of the Related Art

A Japanese Patent Application First Publication No. 2000-255277 published on Sep. 19, 2000 exemplifies a previously proposed engine mount which suspends the internal combustion engine on an active control mount (hereinafter, referred to as an ACM), the ACM including an air chamber. The atmospheric pressure or a negative pressure developed due to a suction action of the engine at a downstream side of a throttle valve is alternately and controllably supplied to the air chamber. Thus, a damping vibration according to a driving condition of the engine is developed to relieve a vibration transmission to a vehicle body.

SUMMARY OF THE INVENTION

However, in the previously proposed engine mount described in the above-identified Japanese Patent Application First Publication, a pressure difference between the negative pressure developed at the downstream side of the throttle valve and the atmospheric pressure is utilized to generate the damping vibration. Hence, when the engine falls in a high load at which an opening angle of the throttle valve is widened, a sufficient negative pressure cannot be developed at the downstream side of the throttle valve. Hence, due to the lowering of the pressure difference from the atmospheric pressure, an ideal damping vibration cannot be developed.

In addition, in a case where a Diesel engine is mounted (suspended), the transmitted vibration magnitude is large as compared with a gasoline engine. Accordingly, it becomes difficult to develop the sufficient damping vibration only by utilizing the pressure difference between the negative pressure developed merely due to the utilization of the suction action of the engine. In addition, if the engine is mounted on the plurality of ACMs, the negative pressure to be supplied to each ACM naturally lacks.

It is, hence, an object of the present invention to provide a vibration damping engine mount which is capable of developing an ideal damping vibration by supplying a required negative pressure stably even if the internal combustion engine is under any driving condition.

According to a first aspect of the present invention, there is provided a vibration damping engine mount for an internal combustion engine, comprising: a vibration controllable support mechanism that supports the internal combustion engine thereon and develops a damping vibration in accordance with a variation in an air pressure supplied thereto against a vibration of the internal combustion engine thereon; a varying air pressure supply section that supplies a varying air pressure to the vibration controllable support mechanism; and an introduction section that introduces one of a negative pressure developed in a negative pressure pump and the atmospheric pressure into the vibration controllable support mechanism in accordance with the vibration of the internal combustion engine.

According to a second aspect of the present invention, there is provided a vibration damping engine mount for an internal combustion engine, comprising: a vibration controllable support mechanism that supports the internal combustion engine thereon and develops a damping vibration in accordance with a variation in an air pressure supplied thereto against a vibration of the internal combustion engine thereon; and a varying air pressure supplying section that supplies a varying air pressure to the vibration controllable support mechanism, the varying air pressure supplying section including a negative pressure pump to develop a negative pressure and an introduction section that introduces either one of the negative pressure developed in the negative pressure pump and the atmospheric pressure into the vibration controllable support mechanism in accordance with the vibration of the internal combustion engine.

According to a third aspect of the present invention, there is provided a vibration damping engine mount for an internal combustion engine having an intake air passage, comprising: a vibration controllable support mechanism that supports the internal combustion engine having the intake air passage thereon and develops a damping vibration in accordance with a variation in an air pressure supplied thereto against a vibration of the internal combustion engine thereon; and an introduction section that introduces either one of the atmospheric pressure or a positive pressure developed within the intake air passage in accordance with a driving condition of the engine and the negative pressure developed in a negative pressure pump in accordance with the vibration of the internal combustion engine.

According to a fourth aspect of the present invention, there is provided a vibration damping engine mount for an internal combustion engine having an intake air passage, comprising: a vibration controllable support mechanism that supports the internal combustion engine having the intake air passage thereon and develops a damping vibration in accordance with a variation in an air pressure supplied thereto against a vibration of the internal combustion engine thereon; a varying air pressure supplying section that supplies a varying air pressure to the vibration controllable support mechanism; and a positive pressure developing section that develops a positive pressure within the intake air passage in accordance with the driving condition of the internal combustion engine, the varying air pressure supplying section comprising: a negative pressure pump that develops a negative pressure therein; and an introduction section that introduces either one of the atmospheric pressure or a positive pressure developed in the intake air passage by means of the positive pressure developing section and the negative pressure developed by means of the negative pressure pump into the vibration controllable support mechanism in accordance with the vibration of the internal combustion engine.

According to a fifth aspect of the present invention, there is provided a vibration damping engine mount for an internal combustion engine having an intake air passage, comprising: a vibration controllable support mechanism that supports the internal combustion engine having the intake air passage thereon and develops a damping vibration in accordance with a variation in an air pressure supplied thereto against a vibration of the internal combustion engine thereon; a varying air pressure supplying section that supplies a varying air pressure to the vibration controllable support mechanism; and an introduction section that develops a positive or negative pressure in the intake air passage in accordance with a driving condition of the internal combustion engine and introduces either one of the air pressure developed in the intake air passage and the atmospheric pressure into the vibration controllable support mechanism in accordance with the vibration of the internal combustion engine.

According to a sixth aspect of the present invention, there is provided a vibration damping engine mount for an internal combustion engine having an intake air passage, comprising: a vibration controllable support mechanism that supports the internal combustion engine having the intake air passage thereon and develops a damping vibration in accordance with a variation in an air pressure supplied thereto against a vibration of the internal combustion engine thereon; a varying air pressure supplying section that supplies the varying air pressure to the vibration controllable support mechanism; and a positive and negative pressure developing section that develops a positive pressure or a negative pressure in the intake air passage in accordance with the driving condition of the internal combustion engine, the varying air pressure supplying section including an introduction section that introduces either one of the air pressure developed in the intake air passage by means of the positive and negative pressure developing section and the atmospheric pressure into the vibration controllable support mechanism in accordance with the vibration of the internal combustion engine.

According to a seventh aspect of the present invention, there is provided a method applicable to a vibration damping engine mount for an internal combustion engine, the vibration damping engine mount comprising a vibration controllable support mechanism that supports the internal combustion engine thereon and develops a damping vibration in accordance with a variation in an air pressure supplied thereto against a vibration of the internal combustion engine thereon and the method comprising: supplying a varying air pressure to the vibration controllable support mechanism; and introducing one of a negative pressure developed in a negative pressure pump and the atmospheric pressure into the vibration controllable support mechanism in accordance with the vibration of the internal combustion engine.

This summary of the invention does not necessarily describe all necessary features so that the invention may also be a sub-combination of these described features.

BRIEF DESCRIPTION OF THE DRAWINGS

FIG. 5 is a schematic view of an estimated fuel injection time calculation purpose control map representing a relationship between an internal combustion engine revolution speed $N_E$ and a fuel injection time threshold value Ts.

FIG. 6 is a schematic view of a duty ratio control map representing a relationship between an internal combustion engine revolution speed $N_E$ and fuel injection timing $T_{INJ}$.

FIG. 7 is a schematic view of a phase control map representing a relationship between internal combustion engine revolution speed $N_E$ and fuel injection timing $T_{INJ}$.

DETAILED DESCRIPTION OF THE PREFERRED EMBODIMENTS

Reference will hereinafter be made to the drawings in order to facilitate a better understanding of the present invention.

(First Embodiment)

Figure 1:
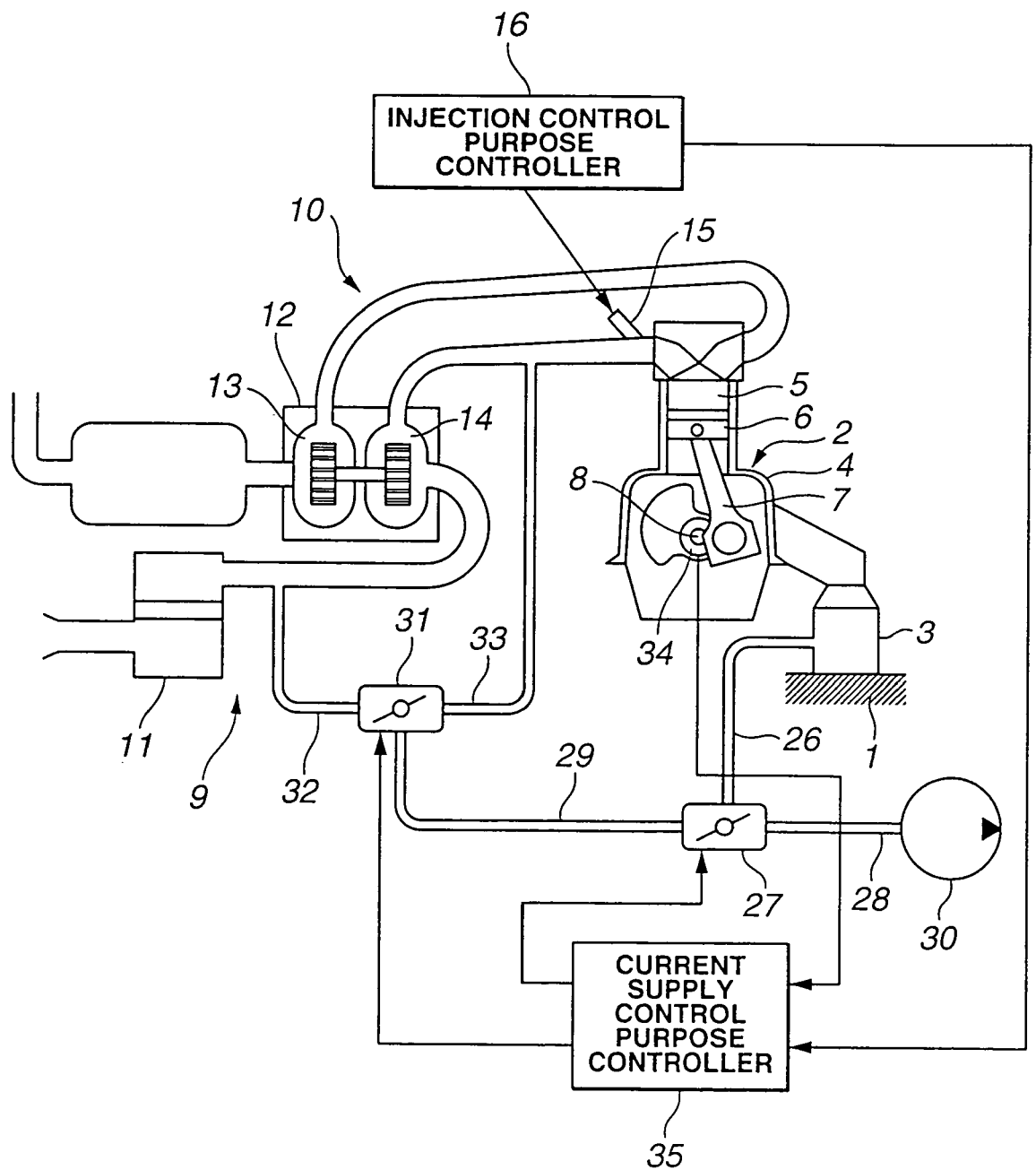
FIG. 1 is a rough configuration view of a vibration damping mount for an internal combustion engine in a first preferred embodiment according to the present invention.

FIG. 1 shows a rough configuration representing a first preferred embodiment of a vibration damping mount for an internal combustion engine (hereinafter, also abbreviated as engine mount) according to the present invention. In FIG. 1, a reference numeral 1 denotes a vehicle body and an internal combustion engine 2 constituted by an in-line four cylinder engine is supported via a vibration control type support mechanism (or called a vibration controllable support mechanism and hereinafter referred to as the vibration controllable support mechanism) 3. Internal combustion engine 2 includes: an engine block 4 which is a main body; a cylinder 5 formed within engine block 4; a piston 6 vertically sliding within cylinder 5, a connecting rod 7 linked to piston 6, and a crankshaft 8 which takes out a power of engine 2 linked to connecting rod 7. In addition, internal combustion engine 2 includes an intake air passage 9 through which the atmosphere is sucked and an exhaust passage through which exhaust gas is outputted. An air cleaner casing 11 is installed as an intake air purifying section (means) to purify the sucked air. In addition, a turbo charger 12 as a supercharger is connected between intake air passage 9 and exhaust passage 10. A turbine 13 revolving with a pressure of exhaust gas causes a compressor 14 disposed coaxially with turbine 13 to be revolved so that the intake air quantity of engine 2 can be increased. In addition, a fuel injector (a fuel injection valve) 15 to inject fuel is disposed at a downstream side of compressor 14 in intake air passage 9 and is drivingly controlled on the basis of a fuel injection signal outputted from an injection control purpose controller 16 (shown in FIG. 1) to inject fuel in accordance with an intake air quantity and revolution speed (NE) of internal combustion engine 2.

It is note that when, along with the increase in the exhaust pressure in accordance with the driving condition of internal combustion engine 3, compressor 14 of turbo charger 12 is revolved at a high speed, the air is supercharged so that a positive pressure (a positive value air pressure) is developed at a downstream side of compressor 14 within the intake air passage 9. Hence, internal combustion engine 2 and turbocharger 12 constitute a positive pressure generating section (positive pressure generating means).

Then, a main body casing 17 of vibration controllable support mechanism 3 approximately in a cylinder shape is fixed onto a vehicle body 1. An elastic member 18 made of an elastic material such as a rubber is fitted into an upper part of an inside of main body casing 17. An linkage tool 19 linked to main body casing 17 via elastic member 18 is movably disposed on an upper part of main body casing 17 with a small play. Internal combustion engine 2 is fixed on the linkage tool 19. A shock absorbing member 20 made of the elastic material such as the rubber is filled within a bottom portion of an inside of main body casing 17. In addition, liquid chambers 21A and 21B filled with a working fluid such as an oil are formed between elastic member 18 and shock absorbing member 20 in the inside portion of main body casing 17. Liquid chambers 21A and 21B are vertically blocked into two chambers by means of a partitioning member 22 made of the elastic material such as the rubber fitted into the inside of main body casing 17. These two liquid chambers 21A and 21B are communicated with a small-diameter passage (not shown) and the working fluid is communicable between both liquid chambers 21A and 21B.

Hence, even if the vibrations of internal combustion engine are transmitted via linkage tool 19, the vibration transmission to vehicle body 1 can be suppressed on the basis of the deformations of elastic member 18, shock absorbing member 20, and partitioning member 22 and a flow of the fluid filled within liquid chambers 21A and 21B. A sheet-formed diaphragm 23 is disposed on an upper surface of partitioning member 22 defining these two liquid chambers 21A and 21B. This diaphragm 23 has an edge portion fixed onto partitioning member 22 by means of a fixture 24 and an air chamber 25 is formed between diaphragm 3 and the upper surface of partitioning member 22. Air chamber 25 has a volume which is expanded or shrunk according to an air pressure introduced from a varying air pressure introduction passage 26. Hence, according to the vibration in internal combustion engine 2, air pressure supplied to air chamber 25 is varied so that a damping vibration to internal combustion engine 2 can be developed. A varying air pressure introduction passage 26 is, as shown in FIG. 1, communicable either one of negative pressure introduction passage 28 or non-negative pressure introduction passage 29 according to a negative pressure switching valve 27. Negative pressure introduction passage 28 is connected to a negative pressure pump 30 which generates a negative pressure. Negative pressure pump 30 always generates a predetermined negative pressure when engine 2 falls in a certain driving state. In addition, non-negative pressure introduction passage 29 is communicable with either an atmospheric pressure introduction passage 32 or a positive pressure introduction passage 33 by means of a switching valve 31. Atmospheric pressure introduction passage 32 branches from an air cleaner casing 11 in intake air passage 9 and from a compressor 14. Positive pressure introduction passage 33 is branched from a downstream side of compressor 14 in intake air passage 9. In addition, negative pressure switching valve 27 and switching valve 31 are provided with electromagnetic solenoids (not shown), respectively. To each solenoid, an exciting (energizing) current from a current supply purpose (or communication control purpose) controller 35 is supplied to control drives of switching valves 27 and 31. In details, negative pressure switching valve 27 communicates varying air pressure introduction passage 26 with non-negative pressure introduction passage 29 under non supply state (or turn-off state) of the exciting (energizing) current. Varying air pressure introduction passage 26 is communicated with negative introduction passage 28 under the supply state (or turn-on state) of the exciting (energizing) current. In addition, switching valve 31 communicates non-negative pressure introduction passage 29 and atmospheric pressure introduction passage 32 when the exciting current to switching valve 31 is turned off. When the exciting current is turned on, non-negative pressure introduction passage 29 is communicated with positive pressure introduction passage 33.

It is noted that, when internal combustion engine 2 is under a certain driving state, the predetermined negative pressure in pump 30 is introduced to negative pressure introduction passage 28. An upstream side portion of air cleaner casing 11 in intake air passage 9 is exposed to the air. Since the portion between air cleaner 11 and compressor 14 is always maintained at the atmospheric pressure, the atmospheric pressure is maintained within atmospheric pressure introduction passage 32 branched from air cleaner 11 and from compressor 14. Furthermore, when a positive pressure is developed at a downstream side of compressor 14 in intake air passage 9 according to the driving condition of internal combustion engine 2, a positive pressure is introduced into positive pressure introduction passage 33 communicated with the downstream side portion of compressor 14.

Therefore, while the exciting-current to switching valve 31 is maintained at the Off state, the exciting current flow to negative pressure switching chamber 27 is either controllably turned off or turned on so that an air pressure varied between the atmospheric air pressure and the negative pressure can be supplied. Furthermore, when a positive pressure is developed at the downstream side of compressor 14 in intake air passage 9 in accordance with the driving condition of internal combustion engine 2, while the exciting current to switching valve 31 is maintained at the ON state, the exciting current to negative pressure switching valve 27 is controllably either turned on or off in accordance with the vibration of internal combustion engine 2. Thus, the air pressure varied between the positive pressure and the negative pressure can be supplied to air chamber 25 of vibration controllable supporting mechanism 3.

In addition, crankshaft 8 is provided with a crank angle sensor 34 of an electromagnetic pick-up type detecting a revolution of crankshaft 8 and outputting a corresponding revolution angle signal. This crankshaft angle sensor 34 detects a serration formed on an outer peripheral surface of a rotor (not shown) revolved together with crankshaft 8 and outputs, for example, a revolution signal for every 10° crank angle signal. A non-tooth portion is formed on the serration for every 180° CA (Crank Angle). Hence, a revolution position of crankshaft 8 can be grasped from the outputted respective signals.

Figure 3:
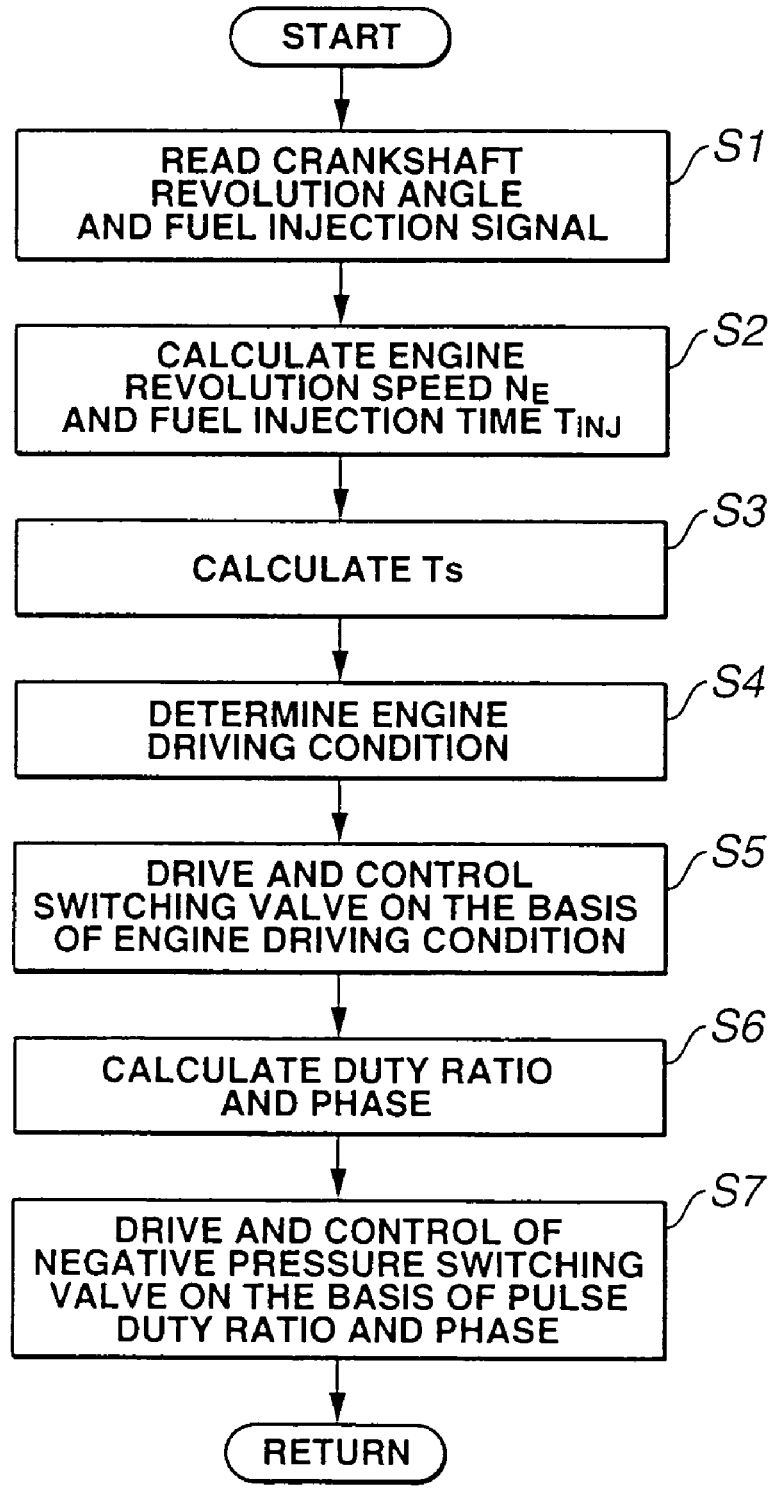
FIG. 3 is an operational flowchart representing an example of a passage communication control procedure executed in a communication control purpose (or a current supply control purpose) controller shown in FIG. 1.

The revolution angle signal on crankshaft 8 detected by means of crank angle sensor 34 and the fuel injection signal outputted by injection control purpose controller 16 as described before are inputted to communication control purpose (or also called, current supply control purpose) controller 35. This communication control purpose controller 35, when engine 2 is in a certain driving state, a vibration control process shown in FIG. 3 is always executed. The supply of the exciting current to negative pressure switching valve 27, positive-and-negative switching valve 31 are controlled by this communication control purpose controller 35.

Next, a passage communication control procedure (or current supply control procedure) executed by communication control purpose controller 35 will be described with reference to FIG. 3. This controller 35 is constituted by a microcomputer having a CPU (Central Processing Unit), a RAM (Random Access Memory), a ROM (Read Only Memory), Input/Output port, a common bus, and so forth.

Figure 4:
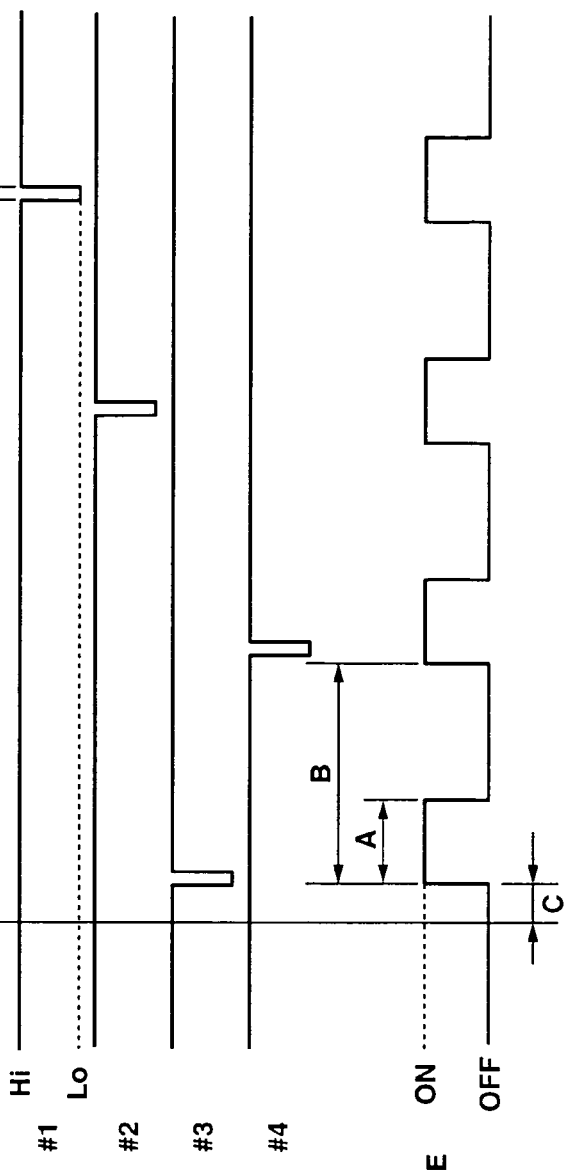
FIGS. 4A, 4B, and 4C are integrally a timing chart for explaining a relationship among a revolution angle of an engine crankshaft, a fuel injection signal, and a switching valve drive signal.

At a step S1, controller 35 reads the revolution angle signals on crankshaft 8 and the fuel injection signal outputted by injection control purpose controller 16 toward fuel injector 15. The revolution angle signal is outputted by one pulse for each 10° crank angle (CA) (refer to FIG. 4A) but is not outputted for each 180° CA in accordance with 180° CA. In addition, the fuel injection signal is a pulse signal commanding fuel injector 15 to make a valve open for a given time and falls from Hi (high) level to a Lo (low) level (refer to FIG. 4B). While the Lo level is maintained, the fuel is injected through fuel injector 15. It is noted that the fuel injection signal is outputted by four cylinders of cylinder Nos. #1 through #4. However, since the amount of fuel injected to each cylinder is approximately the same, it is sufficient to read the fuel injection signal for one cylinder.

At the next step S2, controller 35 calculates internal combustion engine revolution speed (abbreviated as engine speed, i.e., $N_E$) and a fuel injection time duration $T_{INJ}$ on the basis of fuel injection signal read at step S1 and revolution angle signal read at step S1. First, engine speed $N_E$ is calculated by detecting a signal corresponding to the non-tooth portion of the serration for each 180° in the revolution angle signal of crankshaft 8 and calculating engine speed $N_E$ from its period of the signal described above. The fuel injection time duration $T_{INJ}$ is calculated by counting a time duration for which low level Lo of the fuel injection signal is maintained.

At a step S3, controller 35 calculates a threshold value Ts to determine a load state of engine 2 on the basis of the fuel injection time $T_{INJ}$. This threshold value Ts is calculated from internal combustion revolution engine speed $N_E$ calculated at step S2 by referring to a threshold value calculation purpose control map of FIG. 5 representing a relationship between a previously stored threshold value Ts in communication control purpose controller 35 and internal combustion engine revolution speed $N_E$.

In the threshold value calculation purpose control map, the downstream portion of compressor 14 is pressure applied along with an increase in the fuel injection time $T_{INJ}$ representing an engine load and the value of fuel injection time $T_{INJ}$ when the developed air pressure is in excess of the atmospheric pressure is set as threshold value Ts.

Next, at a step S4, controller 35 determines whether fuel injection time $T_{INJ}$ calculated at step S2 is smaller than threshold value Ts calculated at step S3. Thus, controller 35 determines the load state of engine 2. That is to say, when fuel injection time $T_{INJ}$ is shorter than threshold value Ts, an insufficient pressure application is carried out by means of compressor 14 and internal combustion engine 2 falls in a low load state. On the other hand, if fuel injection time $T_{INJ}$ is longer than threshold value Ts, the pressure application by means of compressor 14 is sufficient and engine 2 falls in the high load state.

At a step S5, the supply of the exciting current (or energizing current) to switching valve 31 is controlled in accordance with a load state of engine 2 determined at step S4. That is to say, if engine 2 is determined to be in the low load state, controller 35 determines that the atmospheric pressure introduced into atmospheric pressure introduction passage 32 is higher than the positive pressure developed at positive pressure introduction passage 33. With the exciting current to switching valve 31 turned to OFF state, non-negative pressure introduction passage 29 is communicated with atmospheric pressure introduction passage 32. On the other hand, if controller 35 determines that internal combustion engine 2 falls in the high load state, controller 35 determines that the positive pressure developed at positive pressure introduction passage 33 is higher than the atmospheric pressure introduced into atmospheric pressure introduction passage 32. Then, the exciting current to switching valve 31 is controlled to be turned on so that non-negative pressure introduction passage 29 is communicated with atmospheric pressure introduction passage 32. Next, at a step S6, controller 35 calculates a duty ratio A/B and phase C to control the exciting current supply to negative pressure switching valve 27 in accordance with the vibration of engine 2. This duty ratio A/B is, as shown in FIG. 4C, a rate of an interval A at which the exciting current to negative pressure switching valve 27 to an interval B through which crankshaft 8 is revolved through 180° CA. Phase C indicates an internal of time until the exciting current to negative pressure switching valve 27 is controlled to be turned to ON state with a first pulse fall after the signal corresponding to the non-tooth portion for each 180° revolution of crankshaft 8 at step S1 as a criterion.

The vibrations of internal combustion engine 2 are mainly constituted by a roll vibration around crankshaft 8 axle and vertical vibration thereaabout. The roll vibration is caused by a periodic torque variation receiving crankshaft 8 on the basis of a pressure variation due to fuel combustion. Its magnitude and phase are varied in accordance with fuel injection quantity. In addition, a vertical vibration is caused by a reciprocal inertia force developed due to a vertical motion of a piston 6. Its magnitude is a square of a motion speed of piston 6, namely, is proportional to a square of a revolution speed of crankshaft 8. Its phase is varied in accordance with a revolution angle of crankshaft 8. Then, the duty ratio and phase to drivingly control negative pressure switching valve 27 in accordance with the vibration of internal combustion engine 2 are calculated on the basis of engine speed $N_E$ and fuel injection time $T_{INJ}$.

The duty ratio A/B is previously stored into communication control purpose controller 35. The duty ratio A/B is calculated from engine speed $N_E$ and fuel injection time $T_{INJ}$ calculated at step S2 by referring to a duty ratio calculation purpose control map shown in FIG. 6 in which duty ratio A/B is decided from a relationship between engine speed $N_E$ and fuel injection time $T_{INJ}$. Phase C is previously stored into communication control purpose controller 35 and phase C is calculated from engine speed NE and fuel injection time $T_{INJ}$ calculated at step S2 by referring to a phase calculation control map shown in FIG. 7. It is desirable for duty ratio calculation purpose control map and phase calculation purpose control map to prepare by driving empirically or experimentally the value at which the vibration and noises at the place in problem are minimized.

At a step S7, controller 35 controls the exciting current supply to negative pressure switching valve 27 on the basis of a determination result at step S4, duty ratio calculated at step S5, and phase C calculated thereat. Then, the routine returns to step S1. The passage communication control procedure shown in FIG. 3, negative pressure switching valve 27, and switching valve 31 correspond to communication control section. Steps S3 and S4 correspond to determining section (means). In addition, varying pressure introduction passage 26, negative pressure introduction passage 28, non-negative pressure introduction passage 29, atmospheric pressure introduction passage 32, positive pressure introduction passage 33, negative pressure switching valve 27, and switching valve 31, and communication control purpose (or current supply control purpose) controller 35 correspond to an introduction section (means).

Next, an operation of the first embodiment of the vibration damping engine mount according to the present invention will be described below.

Suppose now that internal combustion engine 2 is in the driving state. At this time, negative pressure pump 30 develops the predetermined negative pressure. This negative pressure is supplied to negative pressure introduction passage 28. Then, communication control purpose controller 35 determines if internal combustion engine 2 is under the low engine load state or high load state (steps S3 and S4). This determination is carried out on the basis of a determination of whether fuel injection time $T_{INJ}$ of fuel injector 15 is smaller (shorter) than threshold value Ts calculated on the basis of internal combustion engine revolution speed $N_E$.

Since, when fuel injection time $T_{INJ}$ is smaller than threshold value Ts, internal combustion engine 2 is under a low load state, the pressure application by means of compressor 14 is insufficient and the air pressure developed on the downstream side of compressor 14 is determined to be lower than the atmospheric pressure. On the basis of this determination, communication control purpose controller 35 controls switching valve 31 to the turn off state so that the non-negative pressure passage 29 and atmospheric pressure introduction passage 32 to introduce the atmospheric pressure into the non-negative pressure introduction passage (step S5).

In addition, the predetermined negative pressure developed on negative pressure pump 30 is introduced on negative pressure introduction passage 28. Then, communication control purpose controller 35 drivingly controls negative pressure switching valve 27 in such a way that varying air pressure introduction passage 26 is alternately communicated with either non-negative pressure introduction passage 29 or negative pressure introduction passage 28 to supply the varying air pressure to vibration controllable support mechanism 3 in accordance with the vibration of internal combustion engine 2 (step S6 and step S7). Duty ratio A/B and phase C to drivingly control negative pressure switching valve 27 are calculated on the basis of internal combustion revolution speed $N_E$ and fuel injection time $T_{INJ}$ by referring to a duty ratio calculation purpose control map and a phase calculation purpose control map.

First, when a negative pressure switching valve 27 is controlled to be turned to ON, negative pressure introduction passage 28 to which the negative pressure is introduced and varying air pressure introduction passage 26 are communicated, the negative pressure is introduced into air chamber 25 of vibration controllable support mechanism 3. The introduction of this negative pressure causes the air within air chamber 25 to be exhausted so that its volume of air chamber 25 is reduced. Next, if negative pressure switching valve 27 is controlled in the off state, the non-negative pressure introduction passage 29 and varying air pressure introduction passage 26 in which the atmospheric pressure is introduced are communicated so that the atmospheric pressure is introduced into air chamber 25 of vibration controllable support mechanism 3 via varying air pressure introduction passage 26. The introduction of the atmospheric pressure causes the atmospheric pressure to be absorbed and its volume is expanded. Thus, an alternative repetition of the on state and off state of negative pressure switching valve 27 can generate the damping vibration in vibration controllable support mechanism 3 in accordance with the vibration of internal combustion engine 2 due to the introduction of the varying air pressure. Consequently, the vibration transmission to vehicle body 1 can be reduced.

On the other hand, when fuel injection time $T_{INJ}$ is equal to or higher than threshold value Ts, internal combustion engine 2 indicates the high load state. Therefore, current supply control (communication control) purpose controller 35 determines that the positive pressure which is larger than the atmospheric pressure is developed. Then, communication purpose controller 35 turns switching valve 31 to the on state so that a positive pressure is introduced into non-negative pressure introduction passage 29 communicating with positive pressure introduction passage 33 (step S5).

The positive pressure is introduced into air chamber 25 of vibration controllable support mechanism 3 via the varying air pressure introduction passage 27 when negative pressure switching valve 27 is drivingly controlled according to the vibration of internal combustion engine 2, non-negative pressure introduction passage 29 is communicated with varying air pressure introduction passage 26. The introduction of the positive pressure causes a larger quantity of air in air chamber 25 of vibration controllable support mechanism 3 to be absorbed and its volume is furthermore expanded. Thus, since the variation width of the supplied air pressure is made large, a sufficient damping vibration is developed against the vibration of internal combustion engine 2 via vibration controllable support mechanism 3. Consequently, a vibration transmission to vehicle body 1 can be relieved.

As described above, either the positive pressure or introducing atmospheric pressure developed in intake air passage 9 in accordance with the engine driving condition of internal combustion engine 2 or the stable negative pressure supplied from negative pressure pump 30 is constructed so as to be supplied to air chamber 25 of vibration controllable support mechanism 3 in accordance with the vibration of internal combustion engine 2. An ideal damping vibration can always be developed. Specially, when internal combustion engine 2 is under a high load state, the air pressure largely varied between the positive pressure and the negative pressure can be supplied to vibration control supporting mechanism 3. As compared with the low load state of internal combustion engine 2, a further effective damping vibration can be developed. It is noted that, in the first embodiment, negative pressure switching valve 27 and positive pressure switching valve 31 have solenoids of the electromagnetic types, the switching valves are not limited to these types but may be constituted by mechanical switching valves.

A fuel injection time duration $T_{INJ}$ has been used to determine whether internal combustion engine 2 is under the low load state or under the high load state. However, this is not limited to this. That is to say, the load state of internal combustion engine 2 may be determined from, for example, internal combustion engine $N_E$, the opening angle signal of the engine throttle valve, and an intake air quantity detected by means of an airflow meter or actual measurement of a pressure difference between positive pressure introduction passage 33 and negative pressure introduction passage 28.

Furthermore, a turbo charger (or supercharger) which increases an intake air quantity of internal combustion engine 2 is constituted by a turbo charger 12 utilizing a pressure of an exhaust valve but is not limited to this. For example, the supercharger utilizing a power of internal combustion engine 2 may be constituted. In addition, although internal combustion engine is constituted by the in-line four-cylinder engine, the engine is not limited to this but may be constituted by a six-cylinder, an eighth-cylinder, a V-type engine, or a horizontal opposing type engine, or a rotary engine, a gasoline engine, or any other internal combustion engine. As described hereinabove, in the first embodiment, any one of the atmospheric pressure introduced in intake air passage 9, the positive pressure developed within intake air passage 9 in accordance with the engine driving condition of internal combustion engine 2, and the negative pressure developed in accordance with negative pressure pump 30 is introduced into vibration controllable support mechanism 3 in accordance with the vibration of internal combustion engine 2, irrespective of any driving situation of engine 2. The negative pressure required can stably be supplied. Such an advantage that an ideal damping vibration can always be developed when the Diesel engine developing the larger vibration level than the gasoline engine is supported and when internal combustion engine 2 is supported by means of a plurality of vibration controllable support mechanism 3.

In addition, since such a turbo charger 12 as a supercharging device as increasing the intake air quantity of internal combustion engine 2 installed on intake air passage 9 is provided and the positive pressure can be developed at the downstream side of compressor 14 included in turbo charger 12 in accordance with driving state of internal combustion engine 2, an actuator such as a pressure applicator developing the positive pressure is not necessary to be newly added and the increase in cost can be suppressed.

Furthermore, the engine mount in the first embodiment includes atmospheric pressure introduction passage 32 into which the atmospheric pressure is introduced and which is communicable with vibration controllable support mechanism 3; positive pressure introduction passage 33 which is branched from the downstream side of turbo charger 12 in intake air passage 9 and which is communicable with vibration controllable support mechanism 3; and a negative pressure introduction passage 28 which introduces the negative pressure developed on negative pressure pump 30 and which is communicable with vibration controllable support mechanism 3 and into which the negative pressure is introduced. Then, communication control purpose (current supply control purpose) controller 35 determines one of the positive pressure introduction passages 33 and the atmospheric pressure passage 32 whose internal pressure is higher than the other in accordance with the driving condition of internal combustion engine 2 and causes either one of the internal pressure higher introduction passage or negative pressure introduction passage is communicated with vibration controllable support mechanism 3 in accordance with the vibration of engine 2. Hence, the varying air pressure to vibration controllable support mechanism 3 can easily and positively be supplied without failure.

Furthermore, since air cleaner 11 is provided which purifies the sucked air (intake air) installed at an upstream side of compressor 14 in intake air passage 9. Atmospheric pressure introduction passage 32 introduces the air (the atmospheric pressure) which is located at the downstream side of air cleaner casing 11 and branched from the upstream side of compressor 14. Hence, the intrusion of the dust into the air chamber 25 via non-negative pressure introduction passage 29 and varying air pressure introduction passage 26 can be prevented.

(Second Embodiment)

Figure 8:
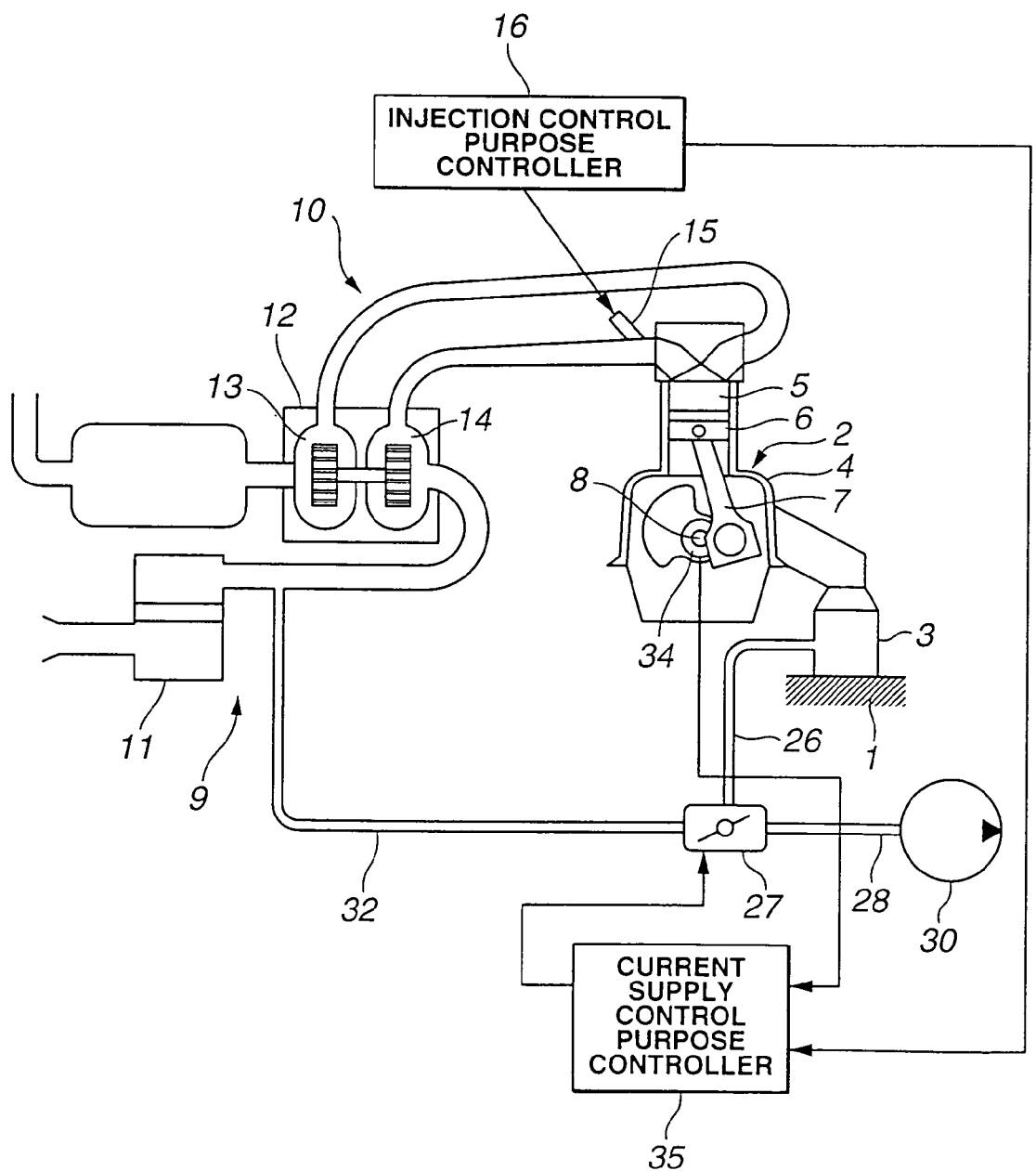
FIG. 8 is a rough configuration view of the vibration damping engine mount in a second preferred embodiment according to the present invention.
Figure 9:
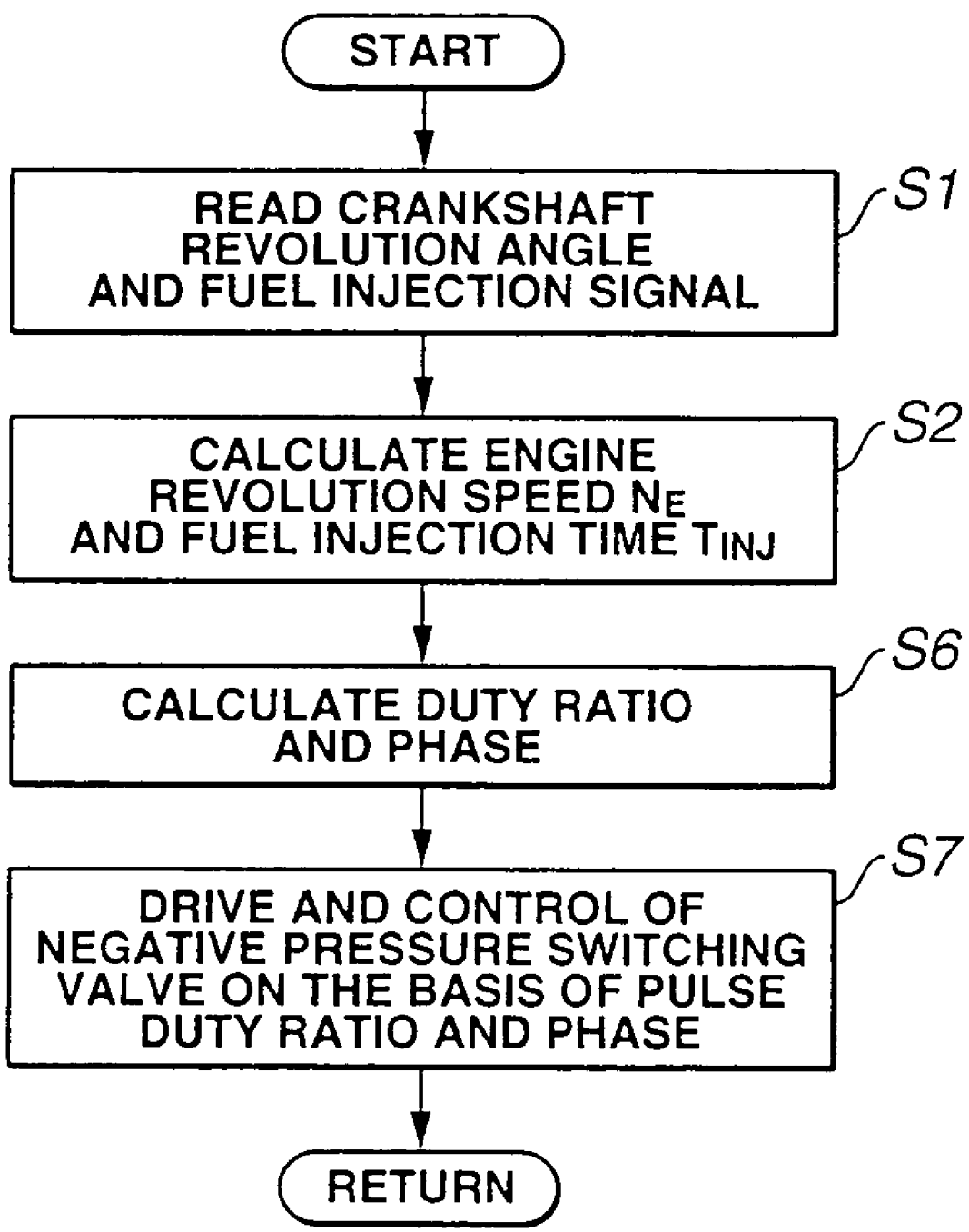
FIG. 9 is an operational flowchart representing an example of the passage communication control procedure executed in the communication control purpose (current supply control purpose) controller shown in FIG. 8.

A second embodiment of the engine mount according to the present invention will be described with reference to FIG. 8. In the second embodiment, the air pressure which varies between the atmospheric pressure and the negative pressure supplied to vibration controllable support mechanism 3 in accordance with the engine driving condition of engine 2 or the air pressure which varies between the atmospheric pressure and the positive pressure, as described in the first embodiment, is limited to only the air pressure which varies between the atmospheric pressure and the negative pressure. That is to say, as appreciated from FIG. 8, switching valve 31, non-negative pressure introduction passage 29, and positive pressure introduction passage 33 are omitted (eliminated) in the second embodiment. In addition, atmospheric pressure introduction passage 32 is connected to negative pressure switching valve 27. Except these omissions and the connection, the structure in the second embodiment is generally the same as in the first embodiment. Hence, the like elements in FIG. 8 as those shown in FIG. 1 have assigned to the same reference numerals and the detailed description of the like elements will herein be omitted. Hence, the passage communication control process executed by current supply control purpose (communication control purpose) controller 35 executes the same process as FIG. 3 except steps S3 through S5. The part of the same process assigns the same step number and the detailed description thereof will herein be omitted. It is noted that the passage communication control process of FIG. 9 and negative pressure switching valve 28 corresponds to communication control section (means). Varying air pressure introduction passage 26, atmospheric pressure introduction passage 32, negative pressure switching valve 27, and communication control purpose controller 35 corresponds to introduction section (means). Hence, while engine 2 is under a certain driving condition, either one of the atmospheric pressure supplied from atmospheric pressure introduction passage 32 and the negative pressure supplied from negative pressure pump 30 is always communicated with vibration controllable support mechanism 3, irrespective of the certain driving condition of engine 2.

Nevertheless, since the required negative pressure is assuredly supplied from negative pressure pump 30, the air pressure which varies between such a stable negative pressure as described above and the introducing atmospheric pressure can be supplied to vibration controllable support mechanism 3. Hence, while the number of parts such as introduction passages, switching valves, and so forth are reduced, the passage communication control process executed by current supply control purpose (communication control purpose) controller 35 can be simplified. In the same way as described above, the ideal damping vibration can be developed on vibration controllable support mechanism 3.

As described hereinabove, according to the second embodiment, since either one of the introducing atmospheric pressure and the negative pressure developed by means of negative pressure pump 30 is introduced to vibration controllable support mechanism 3 in accordance with the vibration of internal combustion engine 2, the required negative pressure can stably be supplied and the ideal damping vibration can be developed irrespective of any driving condition of internal combustion engine 2.

In addition, together with the introduction of the atmospheric pressure, atmospheric pressure introduction passage 32 communicable with vibration controllable support mechanism 3 and negative pressure introduction passage 28 to introduce the negative pressure and communicable to vibration controllable support mechanism 3 are provided, and either one of the atmospheric pressure introduction passage 32 and negative pressure introduction passage 28 is communicated with vibration controllable support mechanism 3 in accordance with the vibration of internal combustion engine 2. Hence, there is an advantage that the varying air pressure can easily and positively be supplied to vibration controllable support mechanism 3.

(Third Embodiment)

Figure 2:
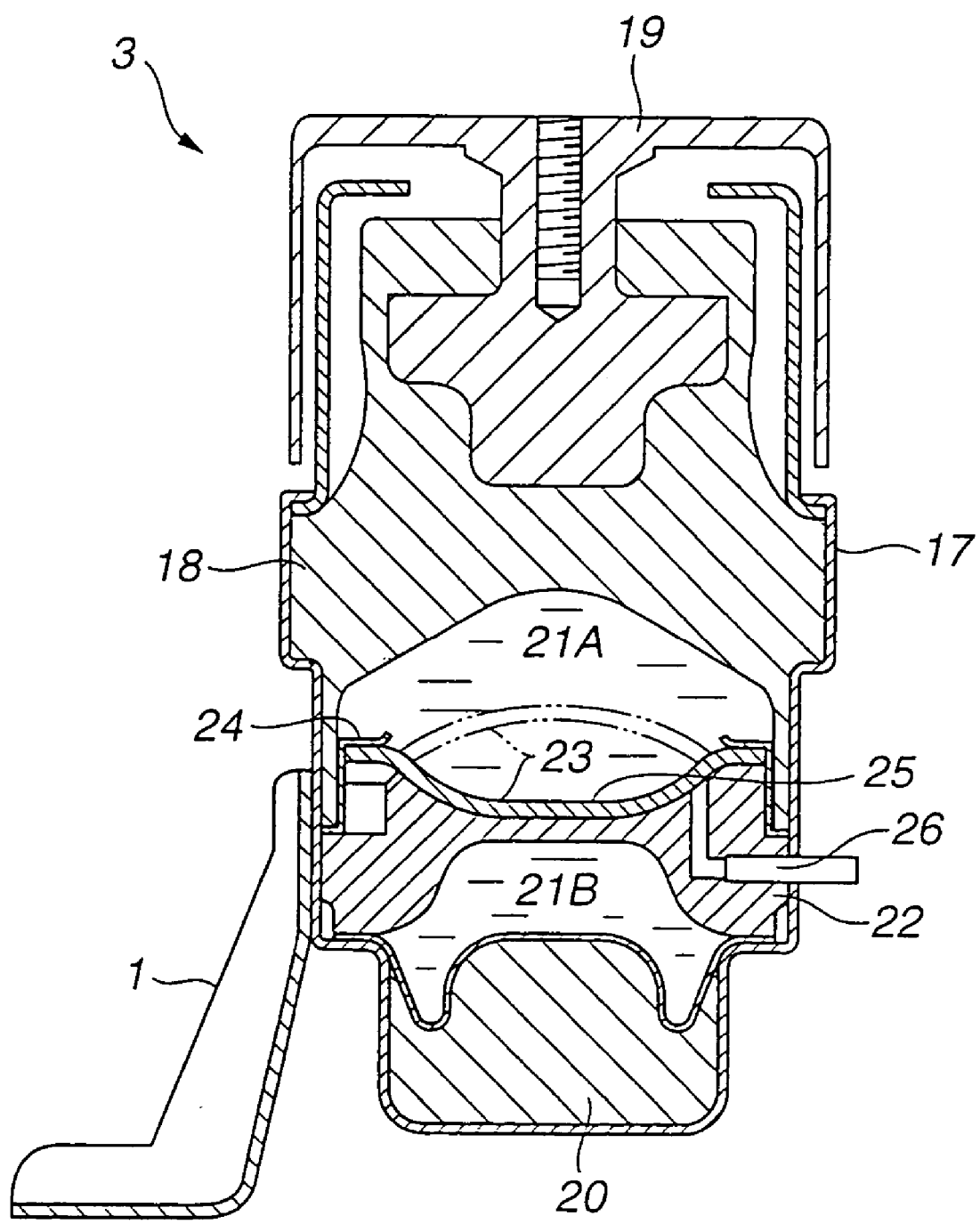
FIG. 2 is a detailed cross sectional view of a vibration controllable support mechanism shown in FIG. 1.
Figure 10:
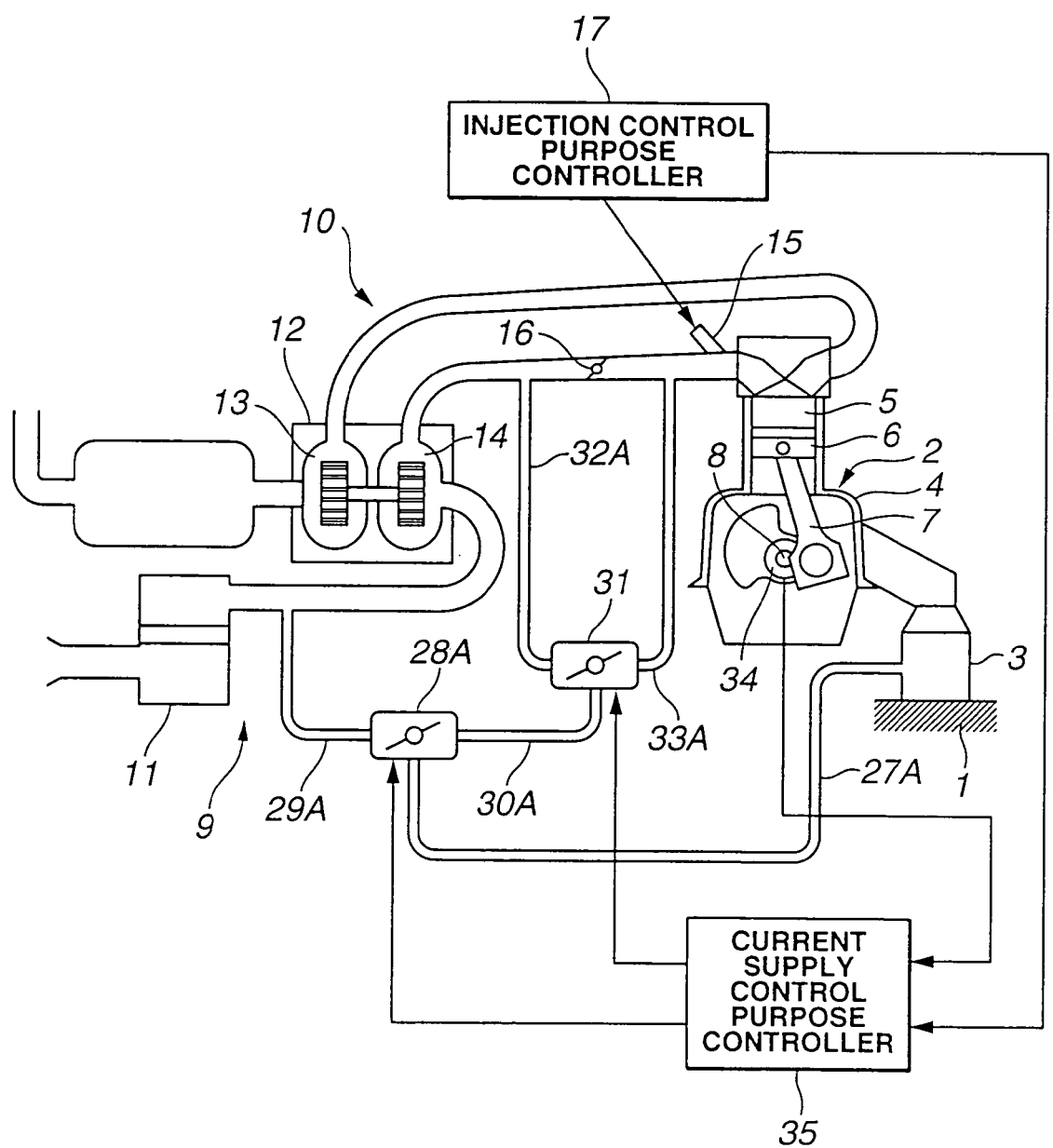
FIG. 10 is a rough configuration view of the vibration damping engine mount in a third preferred embodiment according to the present invention.
Figure 11:
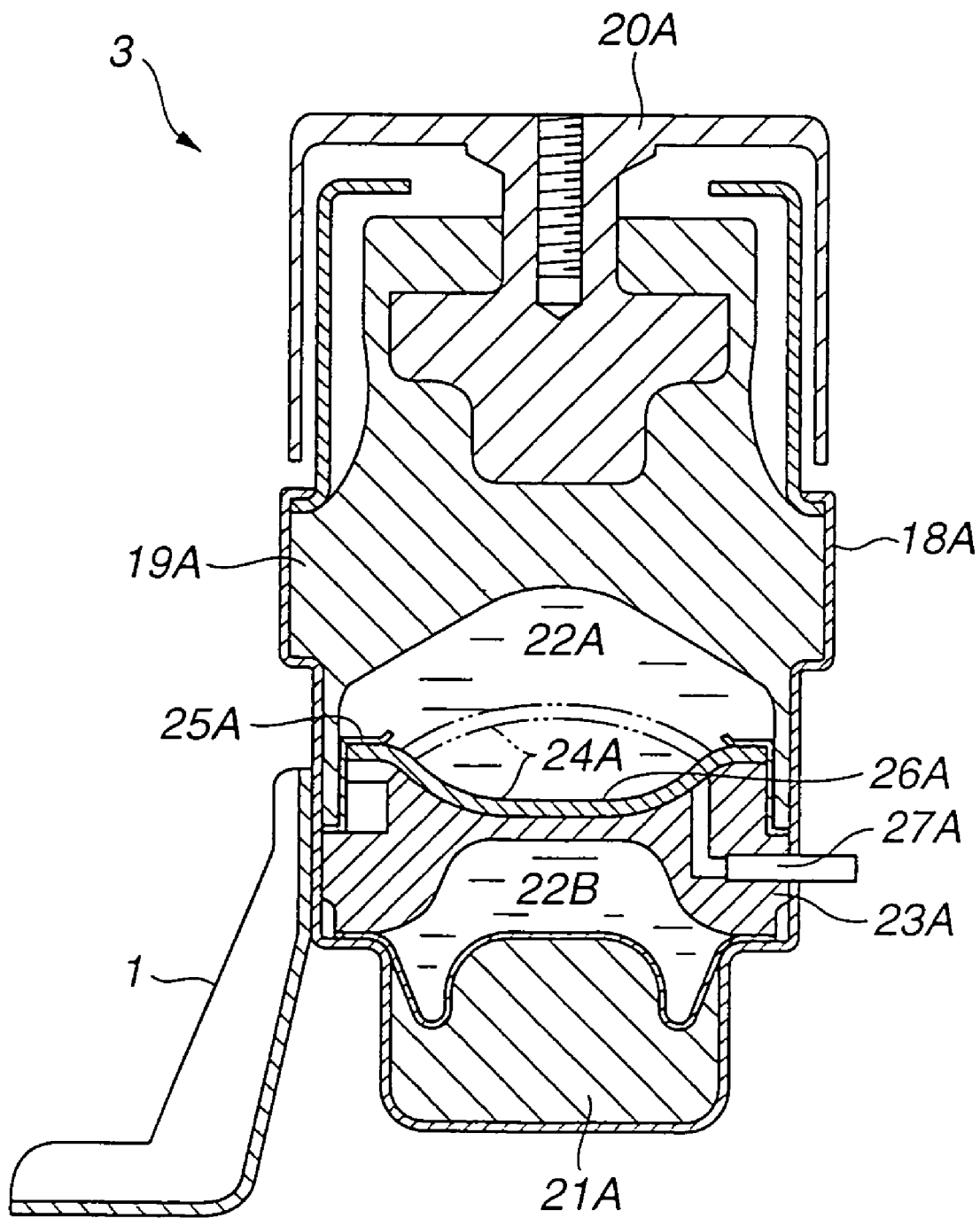
FIG. 11 is a detailed cross sectional view of the vibration controllable support mechanism shown in FIG. 10.

FIGS. 10 and 11 show a third preferred embodiment of the vibration damping engine mount according to the present invention. It is noted that, when the passage communication control process executed by the communication control purpose (or current supply control purpose) controller 35 is explained, FIGS. 3 through 7 described in the first embodiment are used and, although the structure of vibration controllable support mechanism 3 shown in FIG. 11 is generally the same as that described in the first embodiment shown in FIG. 2, the reference numerals are different from those in the first embodiment. Hence, difference points in the third embodiment from the first embodiment will mainly be described.

That is to say, when, along with the increase in the exhaust pressure in accordance with the driving condition of internal combustion engine 2, compressor 14 of turbo charger 12 is revolved at a high speed, the air is supercharged so that the positive pressure is developed at a downstream side of compressor 14 within intake air passage 9. In addition, when the opening angle of throttle valve 16 is narrow (small) according to the driving condition of engine 2, this throttle valve 16 provides a suction resistance so that the negative pressure is developed at a downstream side of throttle valve 16 in intake air passage 9. Hence, engine 2, turbo charger 12, and throttle valve 16 (shown in FIG. 10) correspond to the positive and negative pressure developing means (section).

Then, as shown in FIG. 11, main body casing 18A of vibration controllable support mechanism 3 approximately in the cylinder shape is fixed onto vehicle body 1. Elastic member 19A made of an elastic material such as a rubber is fitted into an upper part of the inside of main body casing 18A. Linkage tool 20A linked to main body casing 18A via elastic member 19A is movably disposed on the upper part of main body casing 18A with a play. Internal combustion engine 2 is fixed on the linkage tool 20A. Shock absorbing member 21A made of the elastic material such as the rubber is filled within the bottom portion of the inside of main body casing 18A. In addition, liquid chambers 22A and 22B filled with the fluid such as the oil are formed between elastic member 19A and shock absorbing member 21A in the internal portion of main body casing 17. Liquid chambers 22A and 22B are vertically blocked into two chambers by means of partitioning member 23A made of the elastic material such as the rubber fitted into the inside of main body casing 18A. These two liquid chambers 22A and 22B are communicated with a small-diameter passage (not shown) and the fluid is communicable between both liquid chambers 22A and 22B.

Hence, even if the vibrations of internal combustion engine are transmitted via linkage tool 20A, a vibration transmission to vehicle body 1 can be suppressed on the basis of deformations of elastic member 19A, shock absorbing member 21A, and partitioning member 23A and the flow of the fluid filled within liquid chambers 22A and 22B. Sheet-formed diaphragm 24A is disposed on an upper surface of partitioning member 23A defining these two liquid chambers 22A and 22B. This diaphragm 24A has an edge portion fixed onto partitioning member 23A by means of fixture 25A and air chamber 26A is formed between diaphragm 24A and the upper surface of partitioning member 23A. Air chamber 26A has the volume which is expanded or shrunk according to an air pressure introduced from varying air pressure introduction passage 27A. Hence, according to the vibration in internal combustion engine 2, air pressure supplied to air chamber 26A is varied so that the damping vibration to internal combustion engine 2 can be developed.

As shown in FIG. 10, switching valve 28A serves to enable the communication of varying air pressure introduction passage 27A with either one of atmospheric pressure introduction passage 29A and positive-and-negative pressure introduction passage 30A. It is noted that, in the third embodiment, negative pressure pump 30 described in the first embodiment is eliminated. Atmospheric pressure introduction passage 29A is connected between air cleaner casing 11 in intake passage 9 and compressor 14. In addition, positive-and-negative pressure introduction passage 30A is communicable with either positive pressure introduction passage 32A or negative pressure introduction passage 33A by means of positive-and-negative pressure switching valve 31. Negative pressure introduction passage 33A is connected with the downstream side of throttle valve 15. In addition, negative pressure switching valve 28A and switching valve 31 are provided with electromagnetic solenoids (not shown), respectively. To each solenoid, an exciting (energizing) current from current supply purpose (or communication control purpose) controller 35 is supplied to control drives of switching valves 28A and 31. In details, switching valve 28A communicates varying air pressure introduction passage 27A and atmospheric pressure introduction passage 23A under the no energizing current supply state (so called, the turned off state) and communicates varying air pressure introduction passage 27A with positive-and-negative pressure introduction passage 22A under the state of the energizing current supply (so called, the turned on state). In addition, positive-and-negative pressure switching valve 31 communicates positive-and-negative pressure introduction passage 30A and positive pressure introduction passage 33A under the turned off state and communicates positive-and-negative pressure introduction passage 30A with negative pressure introduction passage 33A under the energizing current supply state (turned on state). It is noted that fuel injection control purpose controller 17 shown in FIG. 10 corresponds to reference numeral of 16 in FIG. 1 and throttle valve 16 shown in FIG. 10 does not correspond to injection control purpose controller 16 shown in FIG. 1.

It is noted that an upstream side of air cleaner casing 11 in intake air passage 9 is exposed to the atmosphere. Since part of engine 2 interposed between air cleaner casing 11 and compressor 14 is always maintained under the atmospheric pressure, atmospheric pressure introduction passage 29A is also maintained under the atmospheric pressure. In addition, when the positive pressure is developed at the downstream side of compressor 14 in intake air passage 9 in accordance with the driving condition of internal combustion engine 2, the positive pressure is introduced into positive pressure introduction passage 32A which is interposed between compressor 14 and throttle valve 16. On the other hand, when the negative pressure is developed at the downstream side of throttle valve 16 within intake air passage 9, the negative pressure is introduced into negative pressure introduction passage 33A communicated at the downstream side of throttle valve 16.

Therefore, when the positive pressure is developed at the downstream side of compressor 14 in intake air passage 9 in accordance with the engine driving condition of engine 2, while maintaining the exciting current (energizing current) to positive-and-negative pressure switching valve 31 under the turned off state, the energizing current to switching valve 28A is controlled to be under either the turned off state or turned on state. Thus, the air pressure varied between the atmospheric pressure and the positive pressure can be supplied to air chamber 26A in vibration controllable support mechanism 3. On the other hand, when the negative pressure is developed at the downstream side of throttle valve 16 in intake air passage 9 in accordance with the engine driving condition, the energizing current to switching valve 28A is controlled to be turned on state or to be turned off state. Thus, the air pressure varied between the atmospheric pressure and the positive pressure can be supplied.

In addition, crankshaft 8 is provided with crank angle sensor 34 of the electromagnetic pick-up type detecting a revolution angle signal of crankshaft 8. This crankshaft angle sensor 34 detects the serration formed on the outer peripheral surface of the rotor (not shown) revolved together with crankshaft 18 and outputs, for example, a revolution signal for every 10° crank angle signal. A non-tooth portion is formed on the serration for every 180° CA (Crank Angle). Hence, the revolution position of crank shaft 18 can be grasped from the outputted respective signals.

The revolution angle signal on crankshaft 8 detected by means of crank angle sensor 34 and the fuel injection signal outputted by the injection control purpose controller 17 as described before are inputted to communication control purpose (or also called, current supply control purpose) controller 35. This communication control purpose controller 35, when engine 2 is in the certain driving state, the vibration control process (passage communication control procedure) shown in FIG. 3 is always executed. The supply of the exciting (energizing) current to negative pressure switching valve 28A, positive-and-negative switching valve 31 are controlled by this communication control purpose controller 35.

Next, the passage communication control procedure (or current supply control process) executed by (communication control purpose) controller 35 will be described with reference to FIG. 3 through FIG. 7. Namely, the contents of the respective steps are the same as those shown in FIG. 3. However, since the structure in the third embodiment shown in FIG. 10 is somewhat different from that in the first embodiment shown in FIG. 1, the difference points will only be described herein.

That is top say, at step S5, the turn on or off of the energizing current to positive pressure switching valve 31 is controlled in accordance with the load state of internal combustion engine 2 determined at step S4. In details, when controller 17 determines that internal combustion engine 2 falls in the low load state, the energizing current to positive-and-negative pressure switching valve 31 is controlled to be on state so that positive-and-negative pressure introduction passage 30A and negative pressure introduction passage 33A are communicated with each other. On the other hand, when controller 17 determines that internal combustion engine 2 is determined to be in the high load state, the energizing current to positive-and-negative pressure switching valve 31 is controlled to be turned off state so that positive-and-negative pressure introduction passage 30A and positive pressure introduction passage 32A are communicated with each other.

Next, at step S6, controller 35 calculates duty ratio A/B and phase C to control the exciting (energizing) current supply to negative pressure switching valve 27 in accordance with the vibration of engine 2. This duty ratio A/B is, as shown in FIG. 4C, the rate of interval A at which the exciting current to negative pressure switching valve 28A to interval B through which crankshaft 8 is revolved through 180° CA. Phase C indicates the internal of time until the exciting (energizing) current to negative pressure switching valve 28A is controlled to be turned to ON state with the first pulse fall after the signal corresponding to the non-tooth portion for each 180° revolution of crankshaft 8 at step S1 as the criterion.

At step S7, controller 35 controls the exciting current supply to negative pressure switching valve 28A on the basis of the determination result at step S4, the duty ratio calculated at step S5, and phase C calculated thereat. Then, the routine returns to step S1. At this time, the turned on state and the turned off state are drivingly controlled so as to be reversed depending on the determination when engine 2 is in the low load state or the determination when engine 2 is in the high load state. The passage communication control procedure shown in FIG. 3, switching valve 28A, and positive-and-negative switching valve 31 correspond to communication control section (means). Hence, varying air pressure introduction passage 27A, atmospheric pressure introduction passage 29A, positive-and-negative pressure introduction passage 32A, negative pressure introduction passage 33A, positive-and-negative pressure switching valve 31, and communication control purpose controller 35 correspond to introduction section (means).

Next, an operation of the third embodiment of the engine mount according to the present invention will be described below.

Suppose now that internal combustion engine 2 is in a certain driving state. At this time, communication control purpose (or current supply control purpose) controller 35 determines if internal combustion engine 2 is under the low engine load state or high load state (steps S3 and S4). This determination is carried out on the basis of a determination of whether fuel injection time $T_{INJ}$ of fuel injector 15 is smaller (shorter) than threshold value Ts calculated on the basis of internal combustion engine revolution speed $N_E$.

Since, when fuel injection time $T_{INJ}$ is smaller (shorter) than threshold value Ts, internal combustion engine 2 is under the low load state, the pressure application by means of compressor 14 is insufficient. In addition, since the opening angle of throttle valve 16 is small, the negative pressure is developed due to the suction action of internal combustion engine 2 at the part of intake air passage 9 at the downstream side with respect to throttle valve 16. Therefore, at this time, communication control purpose (current supply control purpose) controller 35 controls the positive-and-negative pressure switching valve 31 to be turned on so that a negative pressure is introduced to positive-and-negative pressure introduction passage 30 with positive-and-negative pressure introduction passage 30A communicated with negative pressure introduction passage 33A (at step S5).

Next, communication control purpose (or current supply control purpose) controller 35 drivingly controls switching valve 28A so that either atmospheric pressure introduction passage 29A or positive-and-negative pressure introduction passage 30A is alternately communicated with varying air pressure introduction passage 27A (steps S7 and S8) Duty ratio A/B and phase C to drivingly control switching valve 28A are calculated on the basis of internal combustion revolution speed $N_E$ and fuel injection time $T_{INJ}$ by referring to the duty ratio calculation purpose control map and the phase calculation purpose control map (shown in FIGS. 6 and 7).

First, when switching valve 28 is controlled to be turned to ON, positive-and-negative pressure introduction passage 30A to which the negative pressure is introduced and varying air pressure introduction passage 27A are communicated, the negative pressure is introduced into air chamber 26A of vibration controllable support mechanism 3 via varying air pressure introduction passage 27A. The introduction of this negative pressure causes the air within air chamber 26A to be exhausted so that its volume of air chamber 25 is reduced. Next, if switching valve 28A is controlled in the off state, atmospheric pressure introduction passage 29A into which the atmospheric pressure is introduced and varying air pressure introduction passage 27A in which the atmospheric pressure is introduced are communicated with each other so that the atmospheric pressure is introduced into air chamber 26A of vibration controllable support mechanism 3 via varying air pressure introduction passage 27A. The introduction of the atmospheric pressure to air chamber 26A causes the atmospheric pressure to be absorbed and its volume of air chamber 26A is expanded. Thus, the variation in the air pressure supplied to air chamber 26A permits the generation of the damping vibration in accordance with the vibration of internal combustion engine 2. Consequently, the vibration transmission to vehicle body 1 can be reduced.

On the other hand, when fuel injection time $T_{INJ}$ is equal to or higher than threshold value Ts, internal combustion engine 2 indicates the high load state. In addition, the opening angle of throttle valve 16 is large so that the positive pressure is developed at the downstream side of compressor 14. Therefore, current supply control purpose (communication control) purpose controller 35 determines that the positive pressure is developed at the downstream side of compressor 14. Thus, communication control purpose controller 35 controls positive-and-negative pressure switching valve 31 to be turned off so that the positive pressure is introduced into positive-and-negative pressure introduction passage 30A with positive pressure introduction passage 32A and positive-and-negative pressure introduction passage 30A communicated with each other (at step S5).

Next, communication control purpose controller 35 calculates duty ratio A/B and phase C in accordance with the vibration of internal combustion engine 2 in the same way of a case where internal combustion engine 2 is under the low load condition and controls switching valve 28A so that varying air pressure introduction passage 27A is alternately communicated with atmospheric pressure introduction passage 29A or positive-and-negative pressure introduction passage 30A. It is noted that, during the high engine load state of engine 2, a timing at which switching valve 28A is controlled to be turned on state or to be turned off state is reversed in the case of the low load state of engine 2. If switching valve 28A is controlled to be turned off, positive pressure introduction passage 30A into which the positive pressure is introduced is communicated with varying air pressure introduction passage 27A. The positive pressure is introduced into air chamber 26A of vibration controllable support mechanism 3 via varying air pressure introduction passage 27A. The introduction of the positive pressure causes the air to be sucked into air chamber 26A of vibration controllable support mechanism 3 so that the volume thereof is expanded. If switching valve 28A is controlled to be turned on, the atmospheric pressure introduction passage 29A into which the atmospheric pressure is introduced is communicated with varying air pressure introduction passage 27A so that the atmospheric pressure is introduced into air chamber 26A of vibration controllable support mechanism 3 via varying air pressure introduction passage 27A. The introduction of the atmospheric pressure causes the air within air chamber 26A to be exhausted and the volume thereof is reduced. Thus, the variation in the air pressure supplied permits the damping vibration in accordance with the vibration of engine 2 to be developed at vibration controllable support mechanism 3. Consequently, the vibration transmission to vehicle body 1 can be reduced.

As described above, either one of the positive pressure or the negative pressure developed at air suction (intake air) passage 11 in accordance with the driving condition of engine 2 or the introducing atmospheric pressure is supplied to the air chamber 26A of vibration controllable support mechanism 3 in accordance with the vibration of engine 2 and the damping vibration at vibration controllable support mechanism 3. The ideal damping vibration can always be developed regardless of whether engine 2 falls in any driving condition.

In the third embodiment, atmospheric pressure introduction passage 29A is communicated between air cleaner 11 and compressor 14. However, this is not limited. Hence, for example, atmospheric pressure introduction passage 29A may be communicated with the upstream side of air cleaner casing 11 or one end of atmospheric pressure introduction passage 29A may be opened to the air. In summary, if the atmospheric pressure can always be introduced, any means may be used.

In addition, since turbo charger 12 disposed within intake air passage 9 as the supercharger which can increase the intake air quantity of engine 2 and throttle valve 16 disposed at the downstream side of turbo charger 12 at intake air passage 9 to adjust the intake air quantity of engine 2 are provided, the positive pressure is developed at the downstream side of compressor 14 having turbo charger 12 when turbo charger 12 increases the intake air quantity of engine 2 in accordance with the driving condition of engine 2 and the negative pressure is developed at the downstream side of throttle valve 16 when throttle valve 16 limits the intake air quantity of engine 2 in accordance with the driving condition of engine 2. Thus, if the third embodiment is applied to the turbocharged engine 2, it is not necessary to add newly pressure applicator which develops the positive pressure and, thus, the increase in the manufacturing cost can accordingly be suppressed.

Furthermore, in the third embodiment, positive pressure introduction passage 32A which is branched from the downstream side of turbo charger 12 in intake air passage 9 and which is communicable with vibration controllable support mechanism 3, negative pressure introduction passage 33A which is branched from the downstream side of throttle valve 16 in intake air passage 9 and which is communicable with vibration controllable support mechanism 3, and atmospheric pressure introduction passage 29A into which the atmospheric pressure is introduced and which is communicable with vibration controllable support mechanism 3, positive pressure introduction passage 32A or negative pressure introduction passage 33A is selected in accordance with the driving condition of engine 2, and either one of the selected introduction passage and atmospheric pressure introduction passage 29A is communicated with vibration controllable support mechanism 3 in accordance with the vibration of engine 2. Hence, the varying air pressure can easily and positively be supplied to vibration controllable support mechanism 3.

(Fourth Embodiment)

Figure 12:
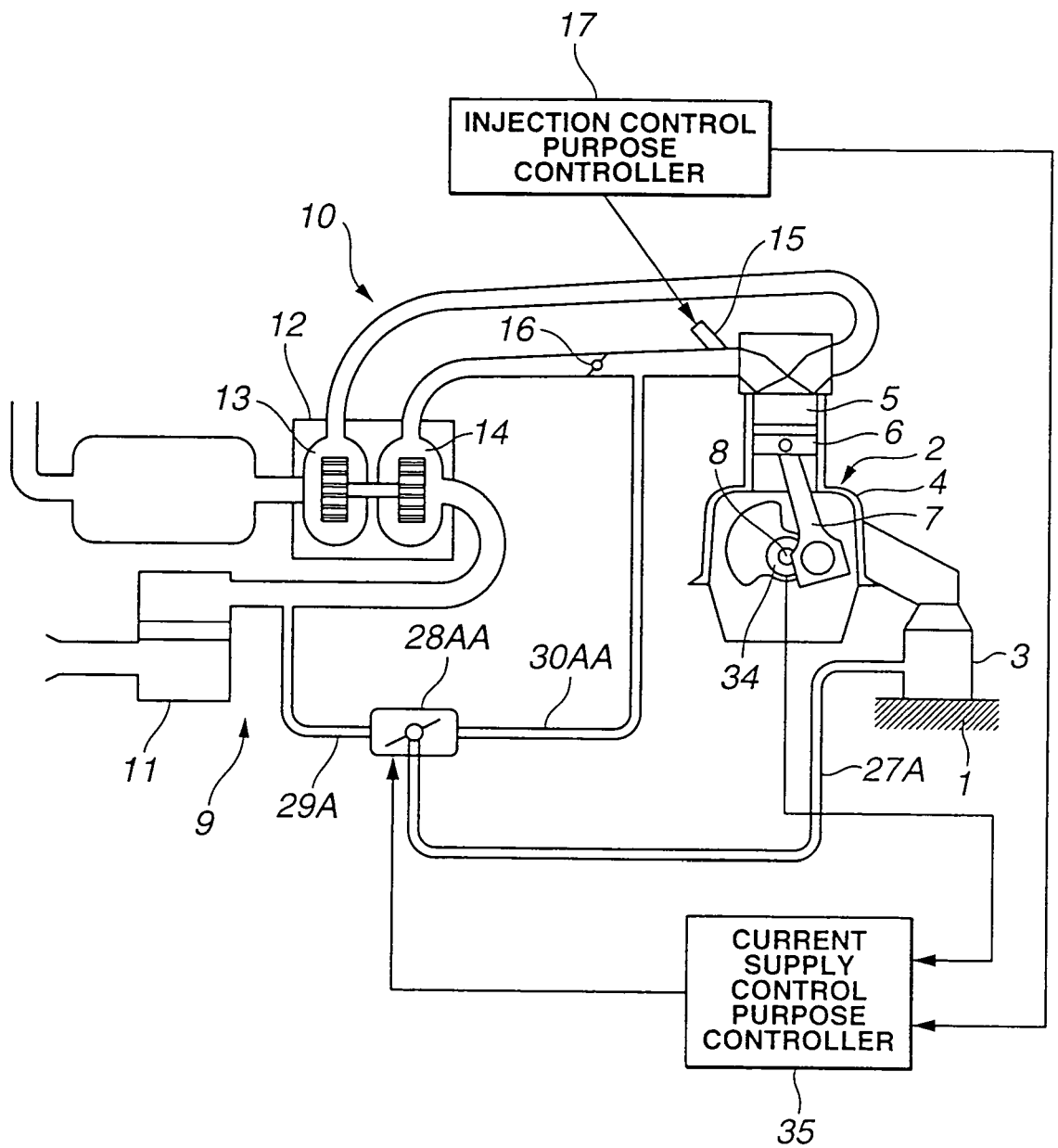
FIG. 12 is a rough configuration view of the vibration damping engine mount in a fourth preferred embodiment according to the present invention.

Next, a fourth preferred embodiment of the vibration damping engine mount will be described with reference to FIG. 12. In the fourth embodiment, positive pressure introduction passage 32A and negative pressure introduction passage 33A are modified to a common introduction passage. That is to say, in the fourth embodiment, as shown in FIG. 12, positive pressure introduction passage 32A, negative pressure introduction passage 33A, and positive-andnegative pressure switching valve 31A are omitted (eliminated). In addition, except positive-and-negative pressure introduction passage 30A is communicated with the downstream side of throttle valve 16 in intake air passage 9, the same structure as the third embodiment is adopted in the fourth embodiment. Hence, the same reference numerals as those shown in FIG. 10 assign the like elements and the detailed description thereof will herein be omitted.

When engine 2 is under the low load state, suction action of internal combustion engine 2 causes the downstream side of throttle valve 16 (shown in FIG. 12) to be developed. Hence, when engine 2 is under the low load state, a negative pressure is introduced into positive-and-negative pressure introduction passage 30AA communicated with the downstream side of throttle valve 16 (shown in FIG. 12). On the other hand, when engine 2 is under the high load state, turbo charger 12 causes the downstream side of its compressor 14 to be pressure applied. At this time, the opening angle of throttle valve 16 shown in FIG. 12 becomes large as the increase in an accelerator manipulated variable. Hence, the pressure application by means of compressor 14 is extended to the downstream side of throttle valve 16. Hence, when internal combustion engine 2 is under a high load state, the positive pressure is introduced into positive-and-negative pressure introduction passage 30AA communicated with the downstream side of throttle valve 16 in the intake air passage 9.

Hence, either one of the positive pressure or negative pressure developed at positive-and-negative pressure introduction passage 30AA in accordance with the driving state of internal combustion engine 2 and the atmospheric pressure can be supplied to air chamber 26A of vibration controllable support mechanism 3 in accordance with the vibration of internal combustion engine 2.

As described above, in the fourth embodiment, positive-and-negative pressure introduction passage 30A communicable with vibration controllable support mechanism 3 and atmospheric air pressure introduction passage 29 are provided and either one of positive-and-negative pressure introduction passage 30 and atmospheric pressure introduction passage 29 is communicated with vibration controllable support mechanism 3. Thus, the similar advantages as those in the case of the third embodiment can be obtained. The structure of the introduction of varying air pressure to vibration controllable support mechanism can be simplified. It is noted that the throttle valve is not shown in FIGS. 1 and 8 but actually the throttle valve is disposed at a downstream side of a connection part of intake passage 9 to positive pressure introduction passage 33 in the case of FIG. 1 and at the upstream side of fuel injector 15 in the case of FIG. 8.

Various changes and modifications may be made without departing from the spirit and scope of the present invention which is to be defined in the appended claims.

The entire contents of two Japanese Patent Applications No. 2002-306561 (filed in Japan on Oct. 22, 2002) and No. 2002-306562 (filed in Japan on Oct. 22, 2002) are herein incorporated by reference. The scope of the invention is defined with reference to the following claims.

What is claimed is:

1. A vibration damping engine mount for an internal combustion engine, comprising:
   a vibration controllable support mechanism that is adapted to support the internal combustion engine thereon and is adapted to develop a damping vibration in accordance with a variation in an air pressure supplied thereto against a vibration of the internal combustion engine thereon; and
   a varying air pressure supplying section that is adapted to supply a varying air pressure to the vibration controllable support mechanism, wherein the varying air pressure supplying section comprises a negative pressure pump that develops a negative pressure and an introduction section that is adapted to introduce either one of the negative pressure developed in the negative pressure pump and a positive pressure developed in an intake passage of the engine into the vibration controllable support mechanism in accordance with the vibration of the internal combustion engine.

2. A vibration damping engine mount for an internal combustion engine as claimed in claim 1, wherein the introduction section comprises:
   a positive pressure introduction passage into which the positive pressure is introduced and which is communicable with a non-negative pressure introduction passage which is communicable with the vibration controllable support mechanism;
   an atmospheric pressure introduction passage into which an atmospheric pressure is introduced and which is communicable with the non-negative pressure introduction passage;
   a negative pressure introduction passage into which the negative pressure developed in the negative pressure pump is introduced and which is communicable with the vibration controllable support mechanism; and
   a passage communication control section that controllably communicates either one of the non-negative pressure introduction passage and the negative pressure introduction passage with the vibration controllable support mechanism in accordance with the vibration of the internal combustion engine.

3. A vibration damping engine mount for an internal combustion engine having an intake air passage, comprising:
   a vibration controllable support mechanism that is adapted to support the internal combustion engine having the intake air passage thereon and is adapted to develop a damping vibration in accordance with a variation in an air pressure supplied thereto against a vibration of the internal combustion engine thereon; and
   an introduction section adapted to introduce either a negative pressure developed in a negative pressure pump in accordance with the vibration of the internal combustion engine or one of an atmospheric pressure and a positive pressure developed within the intake air passage in accordance with a driving condition of the engine.

4. A vibration damping engine mount for an internal combustion engine having an intake air passage as claimed in claim 3, further comprising a turbo charger that is disposed in the intake air passage and increases an intake air quantity of the internal combustion engine and, when the turbo charger increases the intake air quantity of the internal combustion engine in accordance with the driving condition of the engine, the positive pressure is developed at a downstream side of the turbo charger in the intake air passage.

5. A vibration damping engine mount for an internal combustion engine having an intake air passage as claimed in claim 4, wherein the introduction section comprises:

an atmospheric pressure introduction passage into which the atmospheric pressure is introduced and which is communicable with the vibration controllable support mechanism;

a positive pressure introduction passage which is branched from a downstream side of the turbo charger in the intake air passage and is communicable with the vibration controllable support mechanism;

a negative pressure introduction passage into which the negative pressure developed in the negative pressure pump is introduced and which is communicable with the vibration controllable support mechanism;

a determining section that determines one of the atmospheric pressure introduction passage and the positive pressure introduction passage whose internal pressure is higher than the other; and a passage communication control section that controllably communicates either one of the one of the introduction passages whose internal pressure is higher than the other determined by the determining section and the negative pressure introduction passage with the vibration controllable support mechanism in accordance with the vibration of the internal combustion engine.

6. A vibration damping engine mount for an internal combustion engine having an intake air passage as claimed in claim 5, wherein the internal combustion engine includes an intake air purifying section that is disposed at an upstream side of the turbo charger in the intake air passage and purifies intake air, wherein the atmospheric pressure introduction passage is branched from a downstream side of the intake air passage with respect to the intake air purifying section and from a downstream side of the intake air passage with respect to the turbo charger to introduce air thereinto.

7. A vibration damping engine mount for an internal combustion engine having an intake air passage as claimed in claim 5, wherein the determining section determines one of the atmospheric pressure introduction passage and the positive pressure introduction passage whose internal pressure is higher than the other on the basis of a fuel injection time duration.

8. A vibration damping engine mount for an internal combustion engine having an intake air passage as claimed in claim 5, wherein the determining section determines one of the atmospheric pressure introduction passage and the positive pressure introduction passage whose internal pressure is higher than the other on the basis of an engine speed.

9. A vibration damping engine mount for an internal combustion engine having an intake air passage as claimed in claim 5, wherein the determining section determines one of the atmospheric pressure introduction passage and the positive pressure introduction passage whose internal pressure is higher than the other on the basis of an open angle of an engine throttle valve.

10. A vibration damping engine mount for an internal combustion engine having an intake air passage as claimed in claim 5, wherein the determining section determines one of the atmospheric pressure introduction passage and the positive pressure introduction passage whose internal pressure is higher than the other on the basis of the intake air quantity.

11. A vibration damping engine mount for an internal combustion engine having an intake air passage as claimed in claim 5, wherein the determining section determines one of the atmospheric pressure introduction passage and the positive pressure introduction passage whose internal pressure is higher than the other on the basis of a pressure difference between the positive pressure introduction passage and the negative pressure introduction passage.

12. A vibration damping engine mount for an internal combustion engine having an intake air passage, comprising:

a vibration controllable support mechanism that is adapted to support the internal combustion engine having the intake air passage thereon and is adapted to develop a damping vibration in accordance with a variation in an air pressure supplied thereto against a vibration of the internal combustion engine thereon;

a varying air pressure supplying section that is adapted to supply a varying air pressure to the vibration controllable support mechanism; and a positive pressure developing section that is adapted to develop a positive pressure within the intake air passage in accordance with a driving condition of the internal combustion engine, the varying air pressure supplying section comprising: a negative pressure pump that is adapted to develop a negative pressure therein; and an introduction section that is adapted to introduce either the negative pressure developed by the negative pressure pump or one of an atmospheric pressure and a positive pressure developed in the intake air passage by the positive pressure developing section into the vibration controllable support mechanism in accordance with the vibration of the internal combustion engine.

13. A vibration damping engine mount for an internal combustion engine having an intake air passage as claimed in claim 12, wherein the positive pressure developing section comprises a turbo charger that is disposed in the intake air passage and increases an intake air quantity of the internal combustion engine and, when the turbo charger increases the intake air quantity of the internal combustion engine in accordance with the driving condition of the engine, the positive pressure is developed at a downstream side of the turbo charger in the intake air passage.

14. A vibration damping engine mount for an internal combustion engine having an intake air passage as claimed in claim 13, wherein the introduction section comprises:

an atmospheric pressure introduction passage into which the atmospheric pressure is introduced and which is communicable with the vibration controllable support mechanism;

a positive pressure introduction passage which is branched from a downstream side of the turbo charger in the intake air passage and is communicable with the vibration controllable support mechanism;

a negative pressure introduction passage into which the negative pressure developed in the negative pressure pump is introduced and which is communicable with the vibration controllable support mechanism;

a determining section that determines one of the atmospheric pressure introduction passage and the positive pressure introduction passage whose internal pressure is higher than the other; and a passage communication control section that controllably communicates either one of the one of the introduction passages whose internal pressure is higher than the other determined by the determining section and the negative pressure introduction passage with the vibration controllable support mechanism in accordance with the vibration of the internal combustion engine.

15. A vibration damping engine mount for an internal combustion engine having an intake air passage as claimed in claim 14, wherein the internal combustion engine includes an intake air purifying section that is disposed at an upstream side of the turbo charger in the intake air passage and purifies intake air, wherein the atmospheric pressure introduction passage is branched from a downstream side of the intake air passage with respect to the intake air purifying section and from a downstream side of the intake air passage with respect to the turbo charger to introduce air thereinto.

16. A vibration damping engine mount for an internal combustion engine having an intake air passage, comprising:
   a vibration controllable support mechanism that is adapted to support the internal combustion engine having the intake air passage thereon and develops a damping vibration in accordance with a varying air pressure supplied thereto against a vibration of the internal combustion engine thereon;
   a varying air pressure supplying section that is adapted to supply the varying air pressure to the vibration controllable support mechanism; and
   an introduction section that is adapted to develop a positive or negative air pressure in the intake air passage in accordance with a driving condition of the internal combustion engine and is adapted to introduce either an atmospheric pressure or one of the positive and negative air pressures developed in the intake air passage into the vibration controllable support mechanism in accordance with the vibration of the internal combustion engine.

17. A vibration damping engine mount for an internal combustion engine having an intake air passage, comprising:
   a vibration controllable support mechanism that is adapted to support the internal combustion engine having the intake air passage thereon and is adapted to develop a damping vibration in accordance with a variation in an air pressure supplied thereto against a vibration of the internal combustion engine thereon;
   a varying air pressure supplying section that is adapted to supply a varying air pressure to the vibration controllable support mechanism; and
   a positive and negative pressure developing section that is adapted to develop a positive air pressure or a negative air pressure in the intake air passage in accordance with a driving condition of the internal combustion engine, the varying air pressure supplying section including an introduction section that is adapted to introduce either an atmospheric pressure or one of the positive and negative air pressures developed in the intake air passage by the positive and negative pressure developing section into the vibration controllable support mechanism in accordance with the vibration of the internal combustion engine.

18. A vibration damping engine mount for an internal combustion engine having an intake air passage as claimed in claim 17, wherein the positive and negative pressure developing section comprises a turbo charger that is disposed in the intake air passage and increases an intake air quantity of the internal combustion engine and a throttle valve that is disposed in the intake air passage and adjusts the intake air quantity of the internal combustion engine, when the turbo charger increases the intake air quantity of the internal combustion engine in accordance with the driving condition of the engine, the positive pressure is developed at a downstream side of the turbo charger and, when the throttle valve limits the intake air quantity of the internal combustion engine in accordance with the driving condition of the engine, the negative pressure is developed at the downstream side of the throttle valve.

19. A vibration damping engine mount for an internal combustion engine having an intake air passage as claimed in claim 18, wherein the introduction section further comprises:
   a positive pressure introduction passage that is branched from a downstream side of the turbo charger in the intake air passage and is communicable with the vibration controllable support mechanism;
   a negative pressure introduction passage that is branched from the downstream side of the throttle valve and is communicable with the vibration controllable support mechanism;
   an atmospheric pressure introduction passage into which the atmospheric pressure is introduced and is communicable with the vibration controllable support mechanism; and
   a passage communication control section that selects one of the positive pressure introduction passage and the negative pressure introduction passage in accordance with a driving state of the internal combustion engine and controllably communicates either one of the selected introduction passage and the atmospheric pressure introduction passage in accordance with the vibration of the internal combustion engine.

20. A vibration damping engine mount for an internal combustion engine having an intake air passage as claimed in claim 18, wherein the introduction section further comprises:
   a positive-and-negative pressure introduction passage that is branched from a downstream side of the throttle valve in the intake air passage and is communicable with the vibration controllable support mechanism;
   an atmospheric pressure introduction passage into which the atmospheric pressure is introduced; and
   a passage communication control section that controllably communicates either one of the positive-and-negative pressure introduction passage and the atmospheric pressure introduction passage with the vibration controllable support mechanism in accordance with the driving condition and the vibration of the internal combustion engine.

21. A vibration damping engine mount for an internal combustion engine, comprising:
   a vibration controllable support mechanism that is adapted to support the internal combustion engine thereon and is adapted to develop a damping vibration in accordance with a variation in an air pressure supplied thereto against a vibration of the internal combustion engine thereon;
   varying air pressure supply means for supplying a varying air pressure to the vibration controllable support mechanism; and
   introduction means for introducing either one of a negative pressure developed in a negative pressure pump and a positive pressure developed in an intake passage of the engine into the vibration controllable support mechanism in accordance with the vibration of the internal combustion engine.

22. A method applicable to a vibration damping engine mount for an internal combustion engine, the vibration damping engine mount comprising a vibration controllable support mechanism that supports the internal combustion engine thereon and develops a damping vibration in accordance with a variation in an air pressure supplied thereto against a vibration of the internal combustion engine thereon and the method comprising:

supplying a varying air pressure to the vibration controllable support mechanism; and introducing one of a negative pressure developed in a negative pressure pump and a positive pressure developed in an intake passage of the engine into the vibration controllable support mechanism in accordance with the vibration of the internal combustion engine.

23. A vibration damping engine mount for an internal combustion engine having an intake air passage, comprising:

a vibration controllable support mechanism that is adapted to support the internal combustion engine having the intake air passage thereon and is adapted to develop a damping vibration in accordance with a variation in an air pressure supplied thereto against a vibration of the internal combustion engine thereon;

an introduction section that is adapted to introduce either an atmospheric pressure or one of a positive pressure developed within the intake air passage in accordance with a driving condition of the engine and a negative pressure developed in an intake air passage;

a turbo charger that is disposed in the intake air passage and is adapted to increase an intake air quantity of the internal combustion engine; and a throttle valve that is disposed in the intake air passage and is adapted to adjust the intake air quantity of the internal combustion engine, when the turbo charger increases the intake air quantity of the internal combustion engine in accordance with the driving condition of the engine, the positive pressure is developed at a downstream side of the turbo charger and, when the throttle valve limits the intake air quantity of the internal combustion engine in accordance with the driving condition of the engine, the negative pressure is developed at the downstream side of the throttle valve.

24. A vibration damping engine mount for an internal combustion engine having an intake air passage as claimed in claim 23, wherein the introduction section further comprises:

a positive pressure introduction passage that is branched from a downstream side of the turbo charger in the intake air passage and is communicable with the vibration controllable support mechanism;

a negative pressure introduction passage that is branched from the downstream side of the throttle valve and is communicable with the vibration controllable support mechanism;

an atmospheric pressure introduction passage into which the atmospheric pressure is introduced and is communicable with the vibration controllable support mechanism; and a passage communication control section that selects one of the positive pressure introduction passage and the negative pressure introduction passage in accordance with a driving state of the internal combustion engine and controllably communicates either one of the selected introduction passage and the atmospheric pressure introduction passage in accordance with the vibration of the internal combustion engine.

25. A vibration damping engine mount for an internal combustion engine having an intake air passage as claimed in claim 23, wherein the introduction section further comprises:

a positive-and-negative pressure introduction passage that is branched from a downstream side of the throttle valve in the intake air passage and is communicable with the vibration controllable support mechanism;

an atmospheric pressure introduction passage into which the atmospheric pressure is introduced; and a passage communication control section that controllably communicates either one of the positive-and-negative pressure introduction passage and the atmospheric pressure introduction passage with the vibration controllable support mechanism in accordance with the driving condition and the vibration of the internal combustion engine.

26. A vibration damping engine mount for an internal combustion engine, comprising:

a vibration controllable support mechanism that is adapted to support the internal combustion engine, wherein the internal combustion engine comprises an intake air passage, wherein the vibration controllable support mechanism is adapted to develop a damping vibration in accordance with a variation in an air pressure supplied thereto against a vibration of the internal combustion engine thereon; and an introduction section that introduces either an atmospheric pressure or one of a positive pressure developed within the intake air passage in accordance with a driving condition of the engine and a negative pressure developed in an intake air passage.

* * * * *